United States Patent

Yu

[15] 3,686,629

[45] Aug. 22, 1972

[54] SELF-CHECK NUMBER GENERATION

[72] Inventor: Frank K. Yu, Burlington, Mass.

[73] Assignee: Honeywell Inc., Minneapolis, Minn.

[22] Filed: June 16, 1970

[21] Appl. No.: 46,711

[52] U.S. Cl. ....................................... 340/146.1 AJ

[51] Int. Cl. ............................................. G06f 11/10

[58] Field of Search ..........340/146.1 AJ; 235/61.7 A

[56] References Cited

UNITED STATES PATENTS

| | | | |
|---|---|---|---|
| 3,526,875 | 9/1970 | Jourdan | 340/146.1 |
| 3,484,744 | 12/1969 | Gertler et al. | 340/146.1 |
| 3,098,994 | 7/1963 | Brown, Jr. | 340/146.1 |
| 3,105,636 | 10/1963 | Greene | 340/146.1 X |
| 3,163,748 | 12/1964 | Schafer et al. | 340/146.1 X |
| 3,384,902 | 5/1968 | Schroder et al. | 340/146.1 |
| 3,460,117 | 8/1969 | Cohn et al. | 340/146.1 |
| 3,517,385 | 6/1970 | Katsuragi | 340/146.1 |

*Primary Examiner*—Charles E. Atkinson
*Attorney*—Fred Jacob and Leo Stanger

[57] ABSTRACT

A self-check number generating device for generating/validating check numbers associated with a data entry/verification or data transmission system. The generating device is operable in a plurality of modes and may be used for generating or merely validating a check number to be appended to a data number or word.

14 Claims, 27 Drawing Figures

Patented Aug. 22, 1972 3,686,629

22 Sheets-Sheet 1

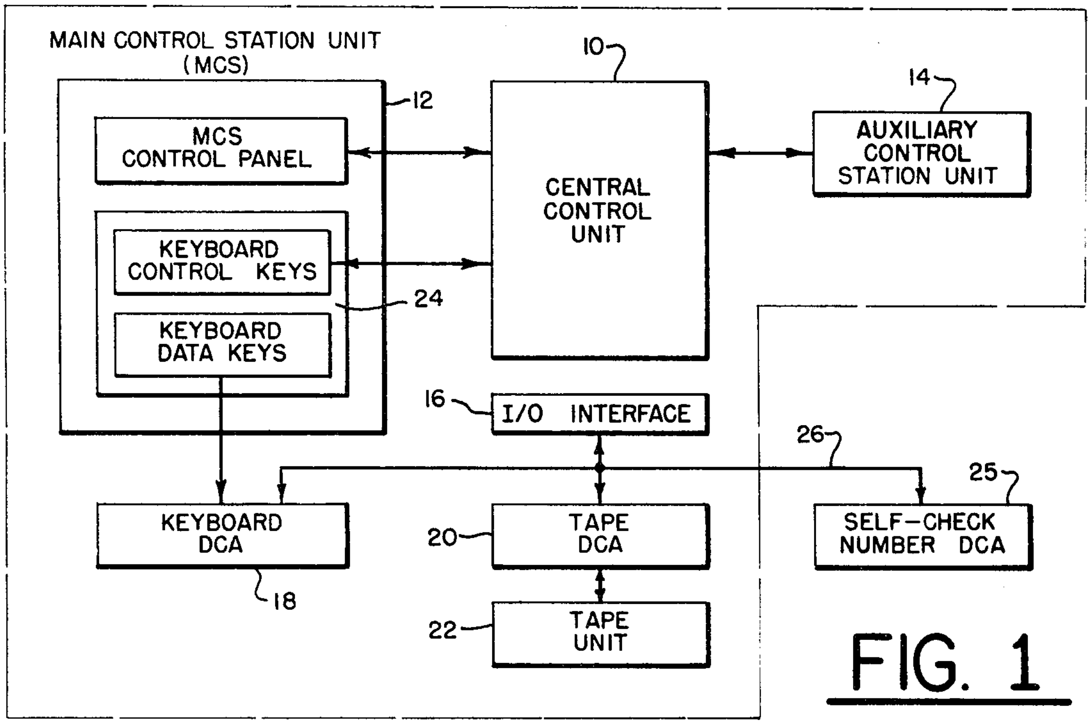

FIG. 1

I/O BUS

MULTI-FUNCTION LINES: F01–F09

SINGLE FUNCTION LINES: ADV–INH

| | STROBE LINES | | | | | |
|---|---|---|---|---|---|---|
| LINE | BIS | ADS | OPS | OCS | IPS | ICS |
| F01 | DATA | AD1* | PB1 | TMD* | PRQ | ERR |
| F02 | DATA | AD2 | PB2 | TRB* | IDP* | MIN |
| F03 | DATA | AD3* | PB3 | EOD* | ALP* | MDC |
| F04 | DATA | AD4* | PB4 | TAK* | BUR* | DUP |
| F05 | DATA | | PB5* | | VER* | SKP |
| F06 | DATA | | PRL | | AGN* | LZK |
| F07 | DATA | | TER1 | | ISP* | TMW* |
| F08 | DATA | | TER2* | | ILZ* | REW* |
| F09 | DATA | TMF* | ERO | | | RLK* |
| ADV | ADDRESS VALID | | | | | |
| INT | INITIALIZE | | | | | |
| PDA | COMMON TIMING | | | | | |
| TSM | TRAFFIC STATE MODIFY | | | | | |
| HSC | HIGH SPEED COMMUNICATOR | | | | | |
| WMD | CCU IN WRITE MODE | | | | | |
| VMD | CCU IN VERIFY MODE | | | | | |
| INH | INHIBIT | | | | | |

FIG. 2

FRANK K. YU
*Inventor*

By Anthony J. Sarli Jr.
*Attorney*

FRANK K. YU
*Inventor*
*By* Anthony J. Sarli
*Attorney*

Patented Aug. 22, 1972 3,686,629

22 Sheets-Sheet 3

FRANK K. YU
*Inventor*

By [signature]
*Attorney*

FRANK K. YU
*Inventor*

By [signature]
*Attorney*

FRANK K. YU
*Inventor*

*By* Anthony J. Sarli Jr.
*Attorney*

FRANK K. YU
Inventor

By Anthony J. Hark Jr.
Attorney

FRANK K. YU
*Inventor*
By Anthony J. Sarli Jr.
*Attorney*

FRANK K. YU
Inventor
By [signature]
Attorney

FRANK K. YU
*Inventor*
*By* [signature]
*Attorney*

FRANK K. YU
Inventor
By Anthony J. Casella Jr.
Attorney

FRANK K. YU
*Inventor*

By Anthony Saxli Jr.
*Attorney*

FRANK K. YU
*Inventor*

By Anthony [signature]
*Attorney*

FRANK K. YU
*Inventor*

*By* [signature]
*Attorney*

FRANK K. YU
Inventor
By Anthony J. Sarli Jr.
Attorney

FRANK K. YU
*Inventor*
By [signature]
*Attorney*

FRANK K. YU
Inventor
By [signature]
Attorney

Patented Aug. 22, 1972 3,686,629

22 Sheets-Sheet 19

FRANK K. YU
Inventor
By Anthony [signature]
Attorney

FRANK K. YU
*Inventor*
By [signature]
*Attorney*

FRANK K. YU
*Inventor*

By *[signature]*
*Attorney*

FRANK K. YU
Inventor
By [signature]
Attorney

SELF-CHECK NUMBER GENERATION

CROSS-REFERENCE TO RELATED APPLICATION

The instant invention relates to a device control area (DCA) useful with the data preparation system disclosed in application Ser. No. 24,771, filed Apr. 1, 1970 entitled "Input/Output Bus," and assigned to the assignee of the instant invention, and the description contained therein is hereby incorporated into this disclosure.

BACKGROUND AND OBJECTS

This invention generally relates to keyboard to magnetic tape data processing units used in the preparation of data from source documents to computer compatible magnetic tape.

More particularly, the invention relates to a self-check number system which uses common hardware to enable validation and/or generation of self-check number fields in one of a plurality of Modulo bases within a unit record of information. Self-check number fields are numerical data fields with a unit digit or check digit arithmetically related to the preceding digits of the field. Account, employee, and customer numbers are common types of self-check number fields. The device provides a manual method of validating check-digits entered in the validate mode, and in the generate mode, the device calculates the check-digit value and places this character into an appropriate memory location of the keyboard to magnetic tape data processing unit. The check-digit is included in the written record on magnetic tape.

SUMMARY OF THE INVENTION

Briefly, the invention herein disclosed comprises a self-check number validation/generation device for use in a data entry system comprising a central control unit, a peripheral input-output device and a bus connecting the input device and the central control unit. Data and program information is transmitted over the bus between the input device and the central control unit and is monitored by the self-check number generator which recognizes specific program codes, the recognition of which causes the self-check number generator to perform arithmetic operations on the data characters to produce a check-digit for validation of the data characters or generation of the self-check number for storage in the central control unit buffer memory for later transfer to magnetic tape.

OBJECTS

It is an object, therefore, of the instant invention to provide a self-check number generating-validating device for use with a data preparation or transmission system.

It is a further object of the invention to provide a self-check number generating system which monitors an input/output bus connecting a peripheral device and a central control unit.

A further object of the invention is to provide an improved self-check number generating device which recognizes program codes transmitted along an input/output bus, and, under direction of such program codes, performs arithmetic operations on the data associated with such program codes to generate/validate a self-check number.

Other objects and advantages of the invention will become apparent from the following description of a preferred embodiment of the invention when read in conjunction with the drawings contained herewith.

BRIEF DESCRIPTION OF THE DRAWINGS

FIG. 1 is a block diagram of a system incorporating the instant invention;

FIG. 2 is a table showing the I/O bus lines used in the invention;

DESCRIPTION OF THE PREFERRED EMBODIMENT

General

Figure 3:
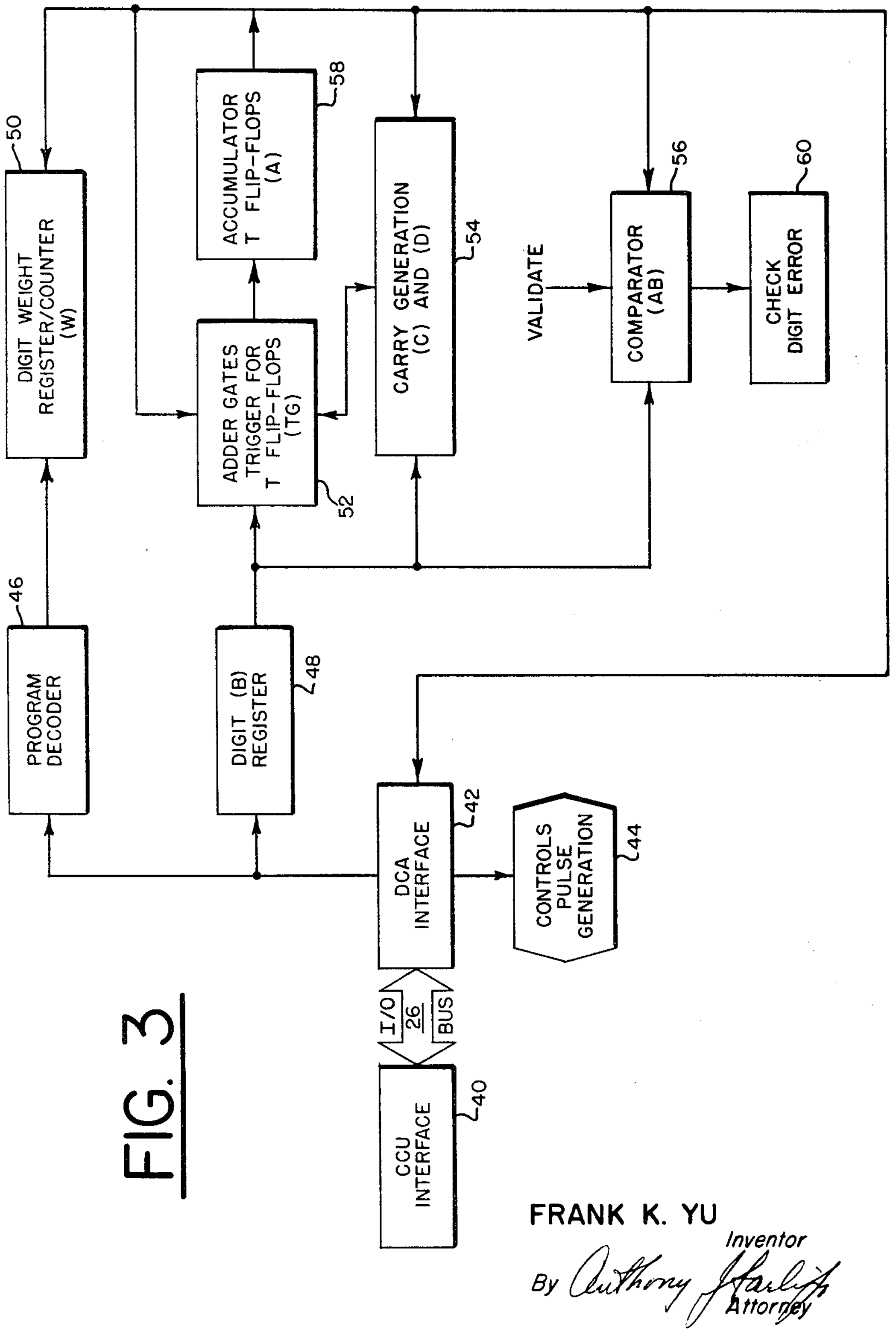
FIG. 3 is a block diagram of the self-check number device of the invention.

In a key-to-tape device such as that disclosed in the aforementioned co-pending patent application, operation may be accomplished in any one of a plurality of modes. Commonly available modes of operation are Program Entry, Program Verify, Data Entry, Data Verify, and Search. In such devices, a buffer memory, which may be a core memory of fixed length is used to buffer data between the keyboard and the file memory or magnetic tape storage medium. Program and/or data information must pass through the buffer memory during each of the operations named above. Such a core memory may have, for example, 21 bits per column and 90 columns. A typical record length is 80 characters, the remaining 10 columns of core being used for longitudinal parity and cyclical redundancy checking. In each column comprising 21 cores or bits, 5 bits may be used for a first program, 5 bits for a second program, 8 bits for data, 1 bit for data parity, 1 bit for duplication (duplify bit), and 1 bit for program parity. Obviously these figures are only exemplary and the memory may be of any convenient size or configuration. For example, a seven-track system may have only 6 data bits per character instead of the 8 normally used in nine-track systems.

The machine may operate under no program control or under the control of either a first or second program, the state of program control being operator selectable by means of a switch on the keyboard control panel.

As previously indicated, such a device may operate in any one of five selectable modes, the modes being selectable by the operator through a five position switch on the keyboard control panel.

In the program entry mode, the program selection switch will be positioned at the first or second program position. The program information is then entered via the keyboard and stored in buffer memory until a complete record (80 characters) is written.

In program verify mode, the operator rekeys the program information, beginning from column 1, and the program bits are compared, bit-by-bit, with the program stored in buffer memory. If an error occurs due to a non-comparison of bits, an alarm is activated to inform the operator of such error.

In data entry mode, the operator selects the program status by means of the program selection switch and begins keying in data from source materials. The data is stored in buffer memory along with a parity bit which has been generated for each data character. At the beginning of the operation, the program in column 1 is extracted and decoded so that the key stroke may be interpreted as the selected character. The character is then stored in buffer memory, and the program information from column 2 is extracted and a second key stroke is made. This continues sequentially through the record until the 80th character is entered into memory, at which time the operator strikes a release key (REL), and the data is transferred from buffer memory onto magnetic tape. The data positions of the core memory are non-destructively read onto the tape, or are immediately refreshed with the same information read on tape. The tape unit then backspaces one record length and reads the data just written back, where it is compared with the data in buffer memory. If an error exists, an indication of such error is given.

In data verify mode, a record is read from tape into buffer memory, and the operator rekeys the information previously recorded. The data is compared bit-by-bit with that stored in buffer memory, and an error will give a suitable indication.

In search mode, an identifier is keyed into buffer memory. The identifier may be of any length, and the remaining character positions in buffer memory will be filled with blanks, which are ignored in the comparison operation. The records on tape are then sequentially read back and compared with the identifier in buffer memory and when a positive comparison is found, the tape stops at an interrecord gap following the desired record.

The instant invention combines a key-to-tape device as described above with a self-check number device control area to enable validation and/or generation of self-check number fields within a unit record of information. Self-check number fields are numeric data fields whose unit digit (referred to hereafter as the check-digit) is arithmetically related to the preceding digits of the field.

The self-check number device control are operates, interchangeably, in two basic modes, generate and validate. In the generate mode, the adapter calculates the check-digit value and places it into the appropriate buffer memory location in the key-to-tape device, to be included in the written record on magnetic tape. In the validate mode, the adapter compares the calculated check-digit value with the keyboard entered check-digit value obtained from the source document.

FIG. 1 shows a block diagram of the overall system. That portion within the dotted line is the key-to-tape device. The key-to-tape device consists of a Central Control Unit 10, a Main Control Station (MCS) unit 12, an Auxiliary Control Station (ACS) unit 14, an I/O interface 16, a Keyboard DCA 18, and a Tape DCA 20. The tape unit 22 is connected to the Tape DCA and the keyboard portion 24 of the MCS is connected to the keyboard DCA 18. The MCS control panel and the Auxiliary Control Station unit are interconnected with the CCU. The various DCA's are connected via a serial "daisy-chained" I/O bus 26 to the I/O interface. The Self-Check Number DCA 25 is connected to the bus 26 and to the I/O interface 16 which provides the interface between the Central Control Unit and the I/O bus.

The I/O interface consists of a Traffic Controller and the I/O bus as described in the aforementioned co-pending application. The I/O bus is the communication medium connecting the Central Control Unit and the device control areas. The Traffic Controller contains traffic state generation logic and the CCU-I/O bus interface. DCA addressing signals are correlated by the Traffic Controller into a correct sequence of cycles to operate a memory controller which forms a portion of the central control unit.

The aforementioned co-pending application contains a detailed description of the Traffic Controller unit which contains a traffic state sequencer, to provide four sequentially addressed traffic states (TS1 to TS4). These states are used to control the addressing sequence of the various adapters attached to the I/O bus. The Self-Check Number DCA operates in Traffic State 2, which is essentially an input traffic state, and further more operates only when the CCU is in the data entry of data verify modes.

The traffic state generation and CCU timing are discussed in detail in the referenced co-pending application and will not be discussed in detail here except for those areas where such discussion is necessary for clarity. Further, the referenced co-pending application contains a detailed description of the I/O bus which will likewise not be repeated except where necessary for an understanding of the instant invention. For convenience, FIG. 2 herein shows the array formed by the strobe and multifunction lines of the I/O bus together with the single function lines which are necessary for the operation of the self-check number DCA.

In the representation of the array (the top portion of the figure) not all the functions present are necessary for operation of the self-check number DCA. Specifically, those starred are not required, but are included for consistency between this application and that of the referenced co-pending application.

THE SELF-CHECK NUMBER DCA

In the following description of the Self-Check Number DCA, the use of a Modulo 10 checking algorithm will be assumed. It is possible, with only minor changes to utilize other algorithms such as Modulo 7 or Modulo 11 for generation of special check-digits, as will be later described.

As previously discussed, the self-check number DCA operates in Traffic State 2. The logic used to generate the traffic states is fully disclosed in the co-pending application referred to, the function of TS2 on the I/O bus is represented by the address strobe ADS plus multifunction line number 2 (FO2), the combination of which is interpreted as being an address of any DCA operating in Traffic State 2 which is in the "on" or active position.

The Self-Check Number DCA operates in conjunction with the Keyboard DCA (or with another data entry DCA, such as a card reader), and may utilize the address validation logic of the Keyboard DCA or internal ADV logic to halt the traffic state sequencer at TS2 until a record length operation is complete.

For a complete description of the logic and timing of the CCU interface and the keyboard (input DCA) interface to the I/O bus, reference is made to the aforementioned co-pending application.

FIG. 3 is a block diagram of the Self-Check Number DCA showing the CCU interface 40 and the I/O bus 26 connected to the DCA interface 42. The operating controls, pulse generation, etc., are represented at 44 and will be discussed later in detail.

The DCA contains a program decoder 46 and a digit or B register 48, both of which are connected to the DCA interface 42 for receiving program and data characters from the I/O bus. The program decoder 46 is further connected at its output to a digit weight register (W register) 50 which weights the base digit values according to the check-digit generation algorithm. The digit register 48 is connected to an adder 52, a carry generator 54 and a comparator 56. The adder 52 is connected to an accumulator 58 to which the contents of the B register are periodically added. The carry generator 54 is interconnected to the adder, and both the carry generator and the comparator 54 and 56 are connected to the output of the accumulator. The output of the accumulator which, at the end of the check-digit calculation, will contain the check-digit is also connected to the DCA interface 42 for transmission of the check-digit over the I/O bus to the CCU memory. An error generator 60 is connected to the comparator to provide an indication of an error under certain conditions to be later described. The comparator 56 has an additional validate input which also will be later described.

The check-digit DCA operates under control of a program stored in the buffer memory of the CCU. The portion of the buffer memory allocated to program storage may vary, but is commonly four or five bits per program character. The program code upon which the check-digit generator operates are four bits in length and are defined as set forth in the following table.

TABLE 1

Modulo 10 Program Patterns

| OCTAL PATTERN | PROGRAM BITS $P_4$ | $P_3$ | $P_2$ | $P_1$ | DESCRIPTION |
|---|---|---|---|---|---|
| 00 | 0 | 0 | 0 | 0 | Signifies a special character position in the base number of a Self-Check Number field. These characters are not considered in generating the check digit value. |
| 10 | 1 | 0 | 0 | 0 | Conditions the Key-to-Tape Unit for check digit validation. Indicates the check digit position of a Self-Check Number field. |
| 11 | 1 | 0 | 0 | 1 | Conditions the key-to-tape unit for check digit generation. Indicates the memory position into which the generated Modulo 10 check digit value is to be placed. |
| 16 | 1 | 1 | 1 | 0 | Conditions the Model key-to-tape unit for Modulo 10 base number calculation. Indicates an even digit of the base number. |
| 17 | 1 | 1 | 1 | 1 | Conditions the Model key-to-tape unit for Modulo 10 base number calculation. Indicates an odd digit of the base number. |

It should be noted that with Modulo 10 checking, the check-digit may be generated in the DCA to be placed in buffer memory of the CCU or the check-digit may be previously calculated and appear on the source document. In the latter case, pattern 10 would be used as the program code for the check-digit position indicating that the number should be merely validated. If it is desired that, in data entry mode, the check-digit number be generated and stored in buffer memory, program pattern 11 would be used thus indicating to the DCA that the position currently being accessed in memory is the position in which the check-digit is to be stored.

Figure 4:
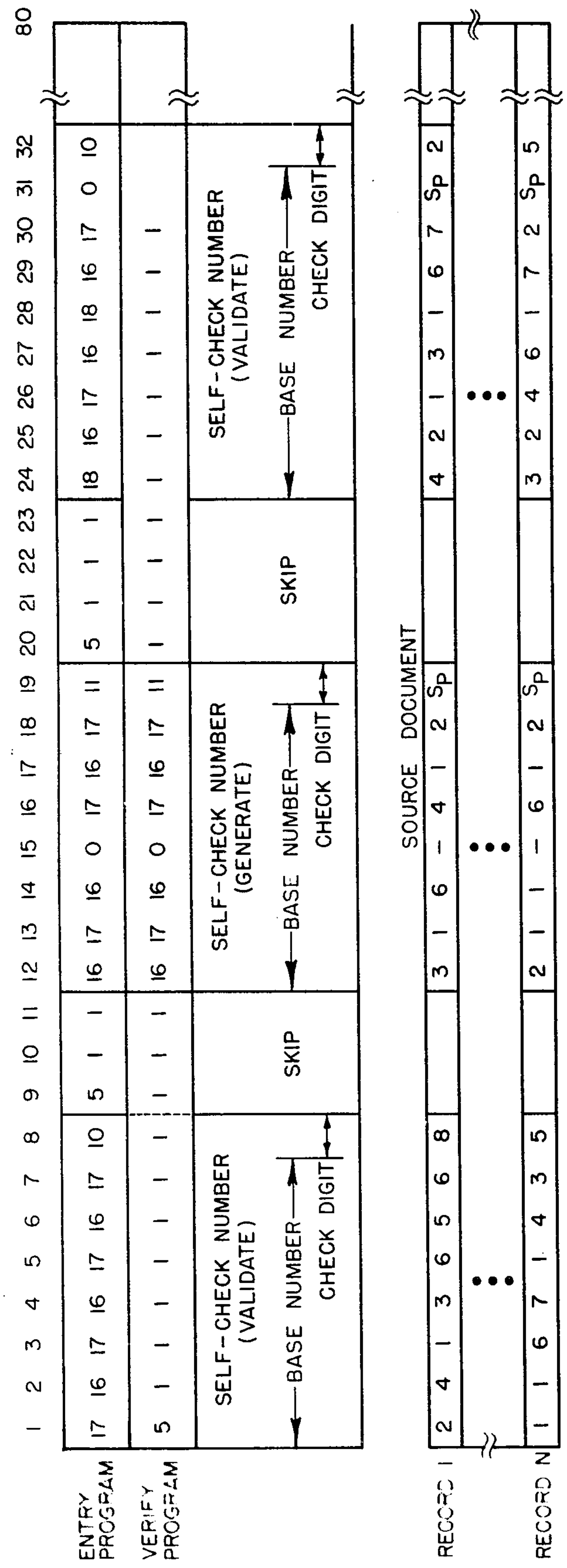
FIG. 4 is an example of a Modulo 10 program set-up.

A source document containing three self-check number fields in each unit record is shown in FIG. 4. The first field (locations 1–8) contains a Validate Self-Check Number field. A Generate Self-Check Number field with a dash in column 15 is the second field (locations 12–19). The third field (locations 24–32) is a Validate Self-Check Number field with the check-digit separated from the base number by a space. The data entry and verify programs for the source document are also shown.

If a self-check number field is validated in the data entry mode, verification of this field is not required in the verify mode of operation. Therefore, it is desirable to ignore the validated field, and, during the data verify mode, the self-check number field is programmed for an automatic skip operation in the CCU buffer memory.

A self-check number field generated in the data entry mode must be verified, as the operator does not known the check-digit value. The self-check number field is therefore programmed during the data verify operation in the same manner as in the data entry mode.

Note that in the first field in FIG. 4 that column position number 1 contains a $17_8$ code indicating that it is an odd digit of the base number. Column 2 contains a $16_8$ indicating an even digit. The succeeding digits alternate, odd and even, until column 8 which contains a $10_8$ indicating that the check-digit is to be validated only.

In the second self-check number field the odd-even codes $16_8$, $17_8$ are again alternated, with the dash ignored by inserting a 0. Column 19, containing the check-digit position has an $11_8$ code indicating a generated Modulo 10 check-digit is to be inserted.

The following arithmetic procedure is employed to calculate a Modulo 10 check-digit value:

1. The units position digit of the base number and each alternate digit to the left are treated as one number and designated as the odd digit number.

2. The 10's position digit of the base number and each alternate digit to the left are treated as one number and designated as the even digit number.

3. The odd-digits number is multiplied by 2.

4. The individual digits of the product obtained in step 3 are added together. This result, in turn, is added to the individual digits of the even-digits number.

5. The sum obtained in step 4 is then subtracted from the next higher number ending in 0 (Modulo 10 subtraction).

6. The numeric difference is the check-digit.

For example, with a base number 73518, the odd-digit number is 758 and the even-digit number is 31. Multiplying the odd-digits number by 2 results in a product 1516. Adding the product digits 1+5+1+6 to the even digits number 3+1 gives a result of 17. The next higher number ending in 0 is 20; 20–17=3, the check-digit value. The complete self-check number field is then: 735183.

Figure 5:
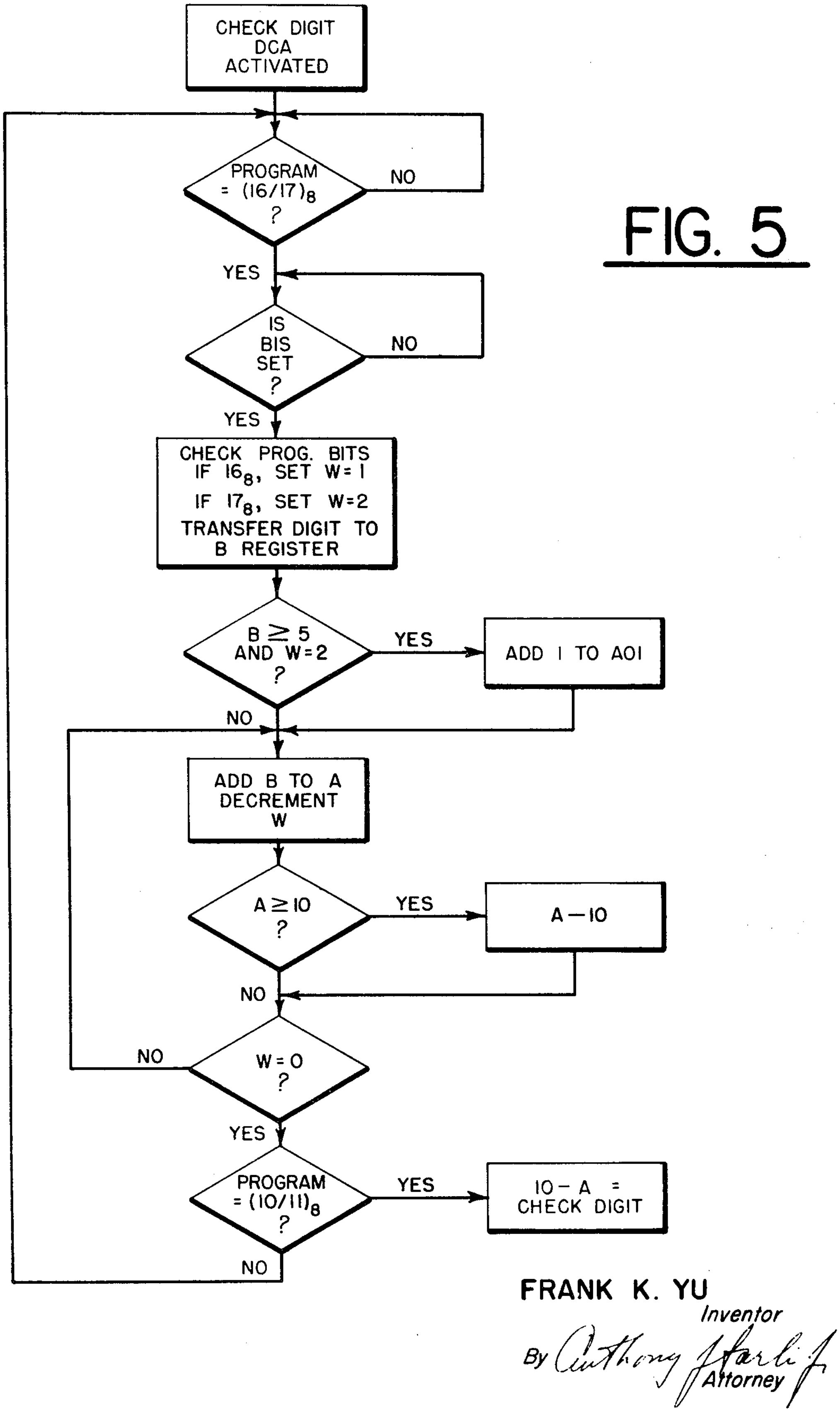
FIG. 5 is a flow diagram of Modulo 10 check-digit generation.

FIG. 5 shows a flow diagram of the actual steps taken by the check-digit DCA in performing a Modulo 10 check-digit generation/validation. When the self-check number DCA is activated, the program bits from the CCU buffer memory are examined. If the program configuration is $16_8$ or $17_8$, the Bidirectional Information Strobe (BIS) then transfers the base number digit to the B register (CDB01–B04). The base number digits are alternately assigned as either odd or even. The even digit, which is signified by a program code of $16_8$ carries a weight of 1. The Weight Counter (CDW01–W03) is therefore set to a count of 1. The odd program configuration ($17_8$) assigns a weight of 2 to the digit. CDW01–03 is set to 2 and the digit is added to the Accumulator (CDA01–A04) twice. If the digit value is greater than or equal to 5 and Weight Counter equals two (W=2), a decimal-carry will occur. The carry is required in the check-digit calculation so a one is added to the Accumulator. Now the contents of CDB01–B04 are added to the Accumulator, and the Weight Counter is decremented. When the additive result is greater than or equal to 10, the DCA logic subtracts 10 from CDA01–A04. The subtraction is actually performed, in the system, by adding 6 to the Accumulator and ignoring the produced binary carry. The Weight Counter value is now checked. If it is not equal to zero, the B register contents are again added to CDA01–A04, and the Weight Counter is decremented. If the Weight Counter equals zero, the operation of this digit of the base number has been completed and the next program bits from the CCU are examined. If the next program configuration is $16_8$ or $17_8$, the above process is repeated. When a program configuration of $10_8$ or $11_8$ is sensed, the final check-digit value is obtained by subtracting 10 (10'scomplement) from the accumulator.

MODULO 10 OPERATION

DCA Addressing

Figure 6A:
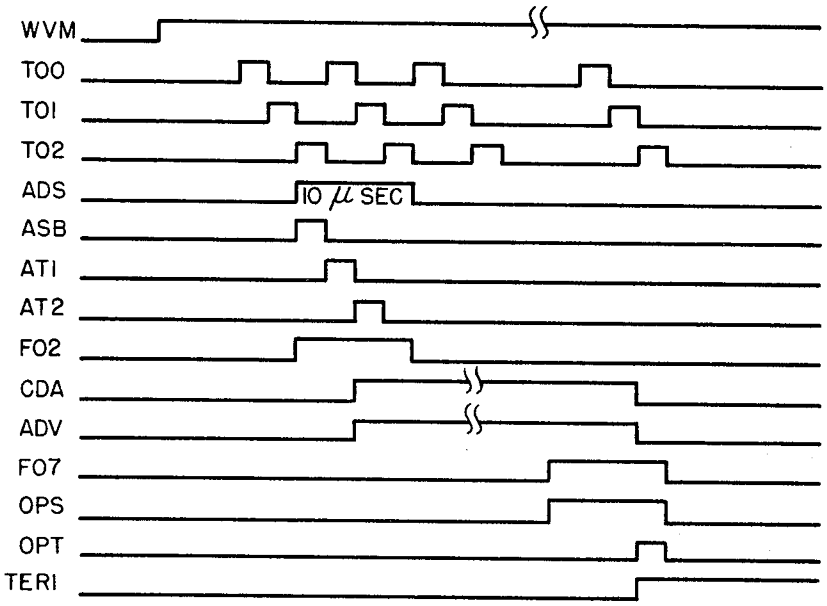
FIGS. 6A and 6B are timing diagrams of a Modulo 10 check-digit device.
Figure 6B:
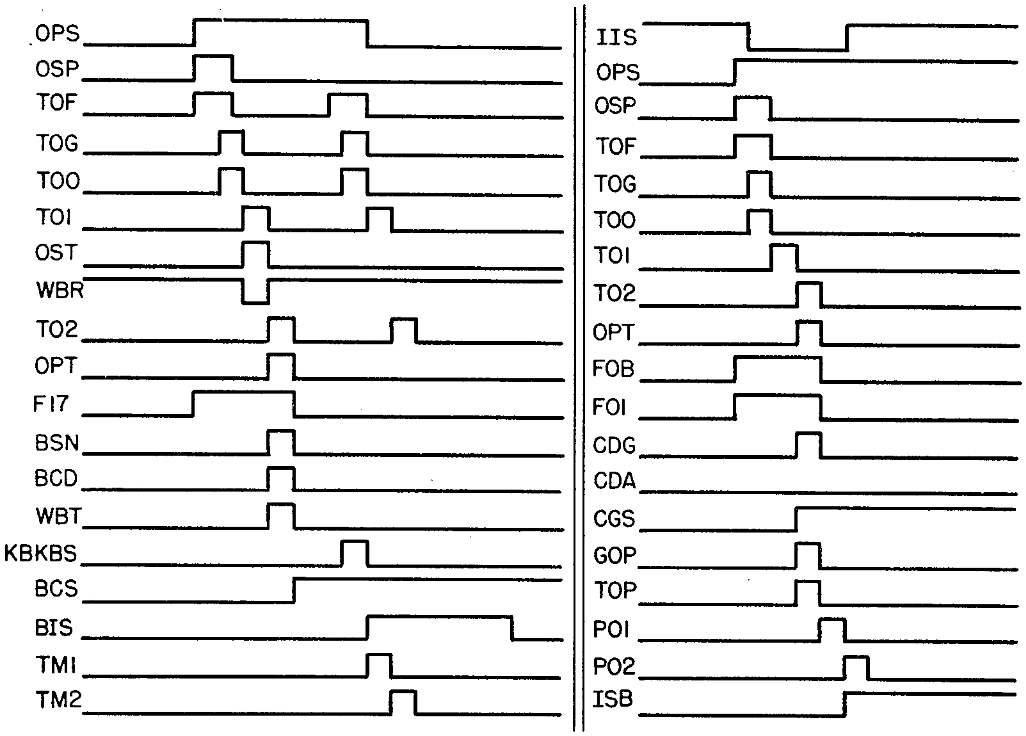
Figure 7A:
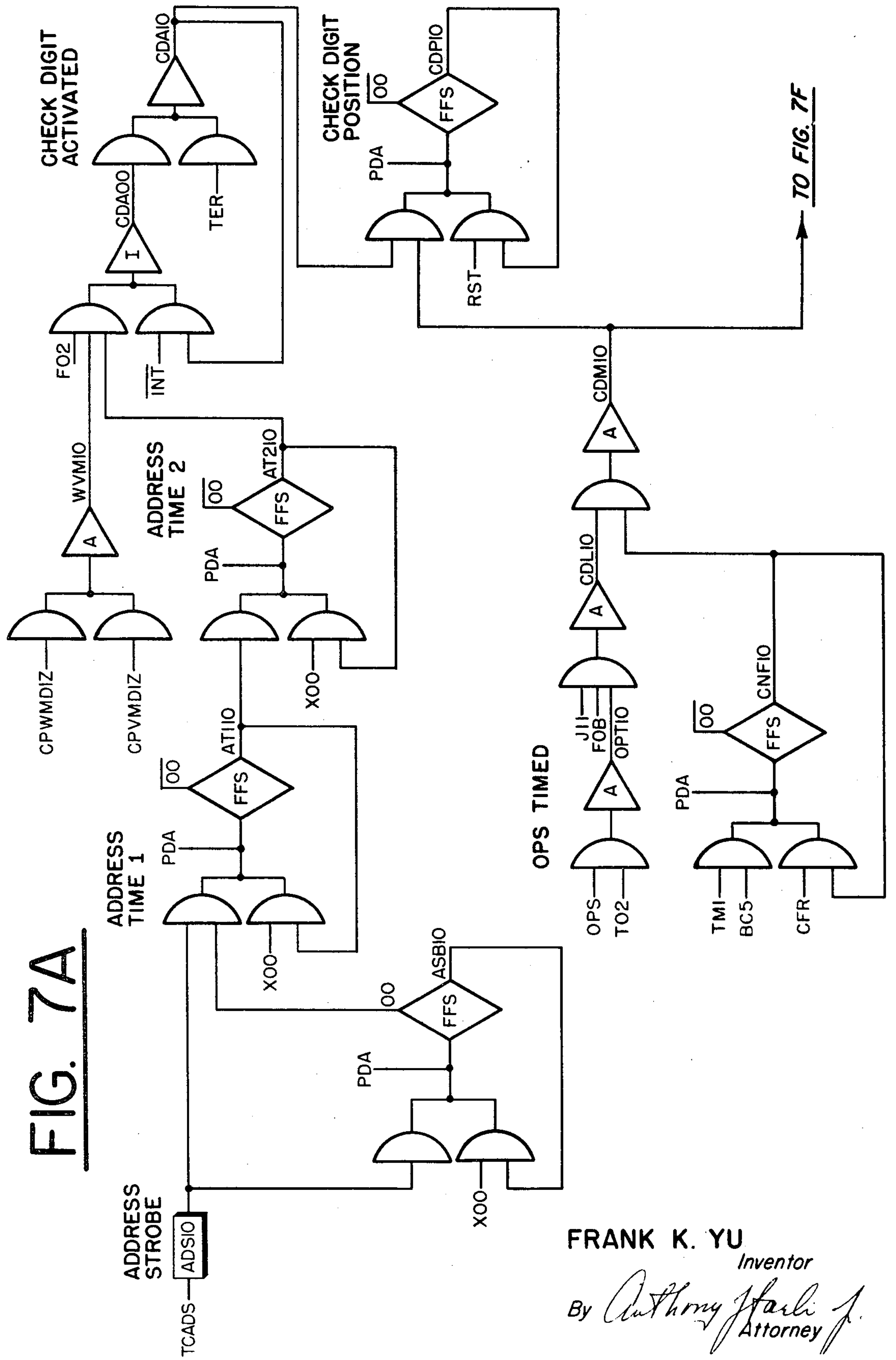
FIGS. 7A–7B is a logic block diagram of the self-check number device.
Figure 7B:
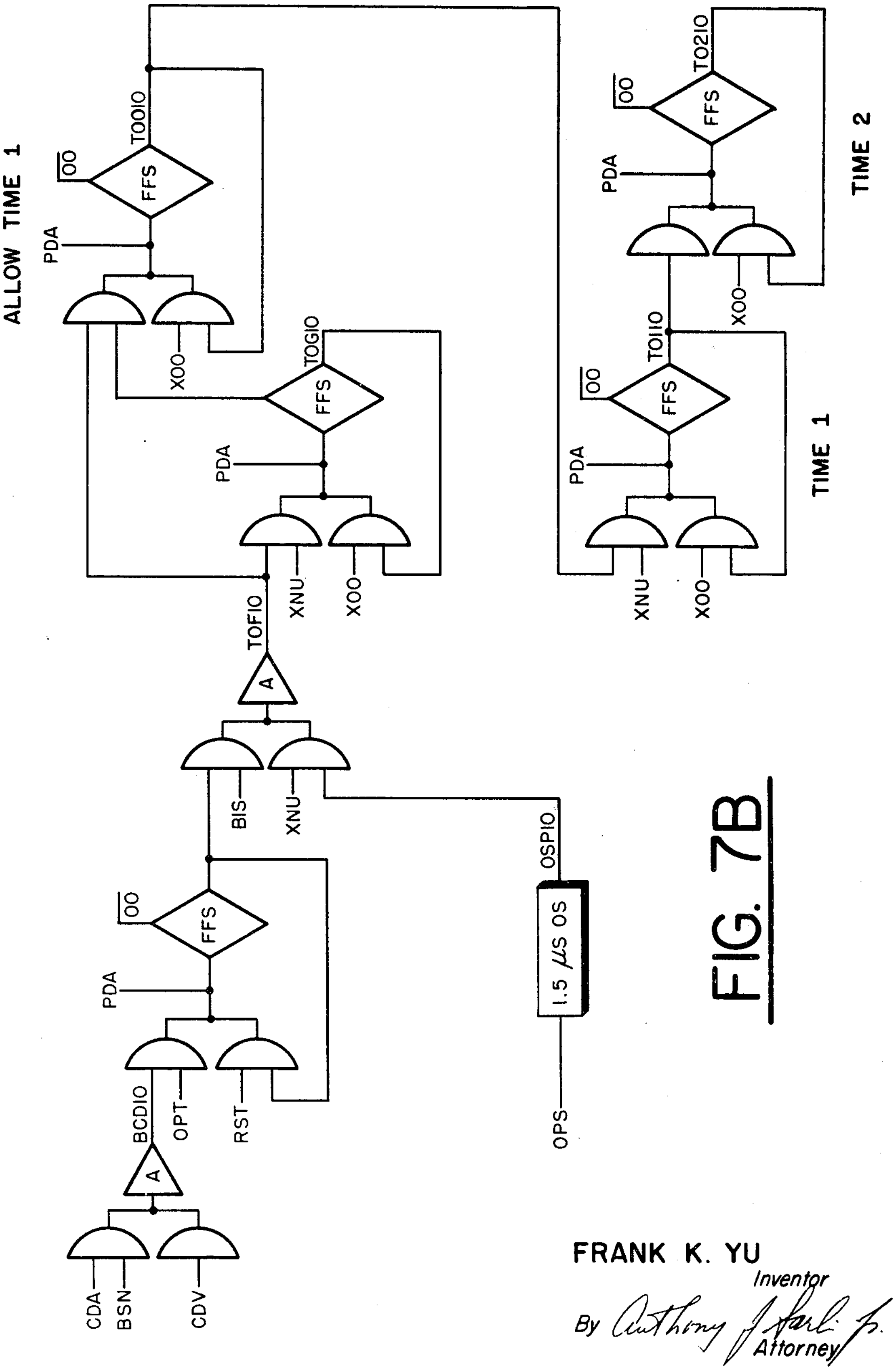
Figure 7C:
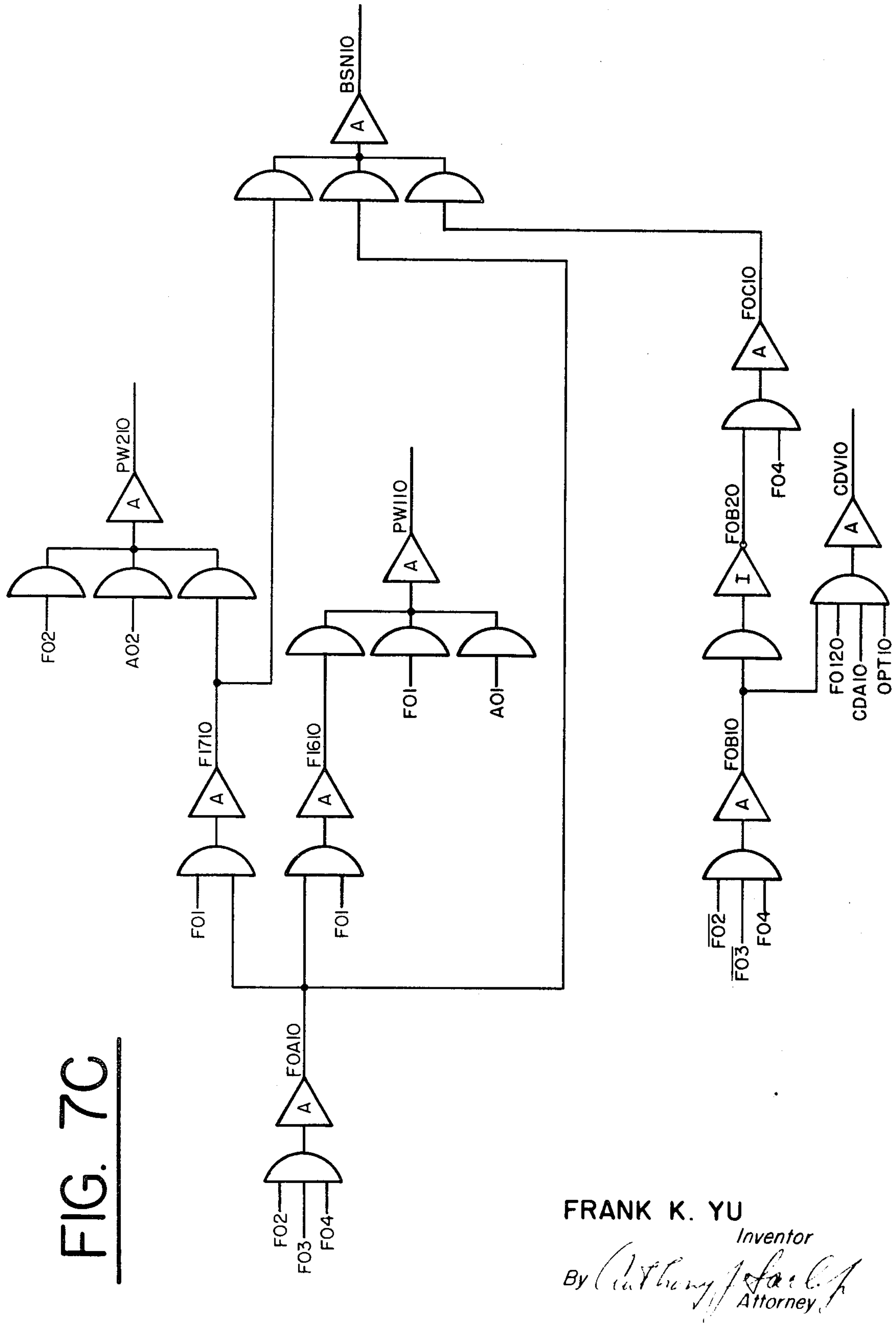
Figure 7D:
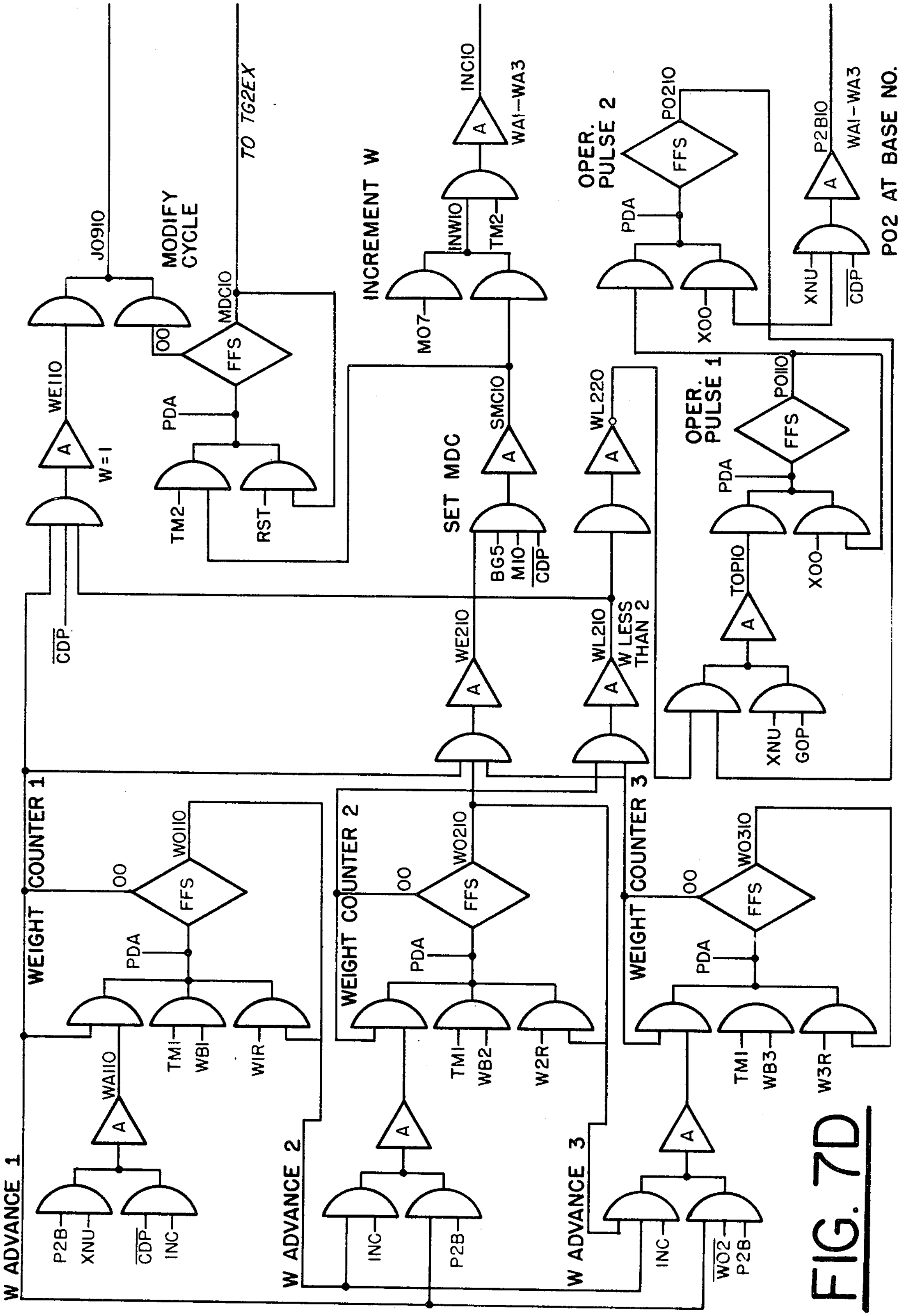
Figure 7E:
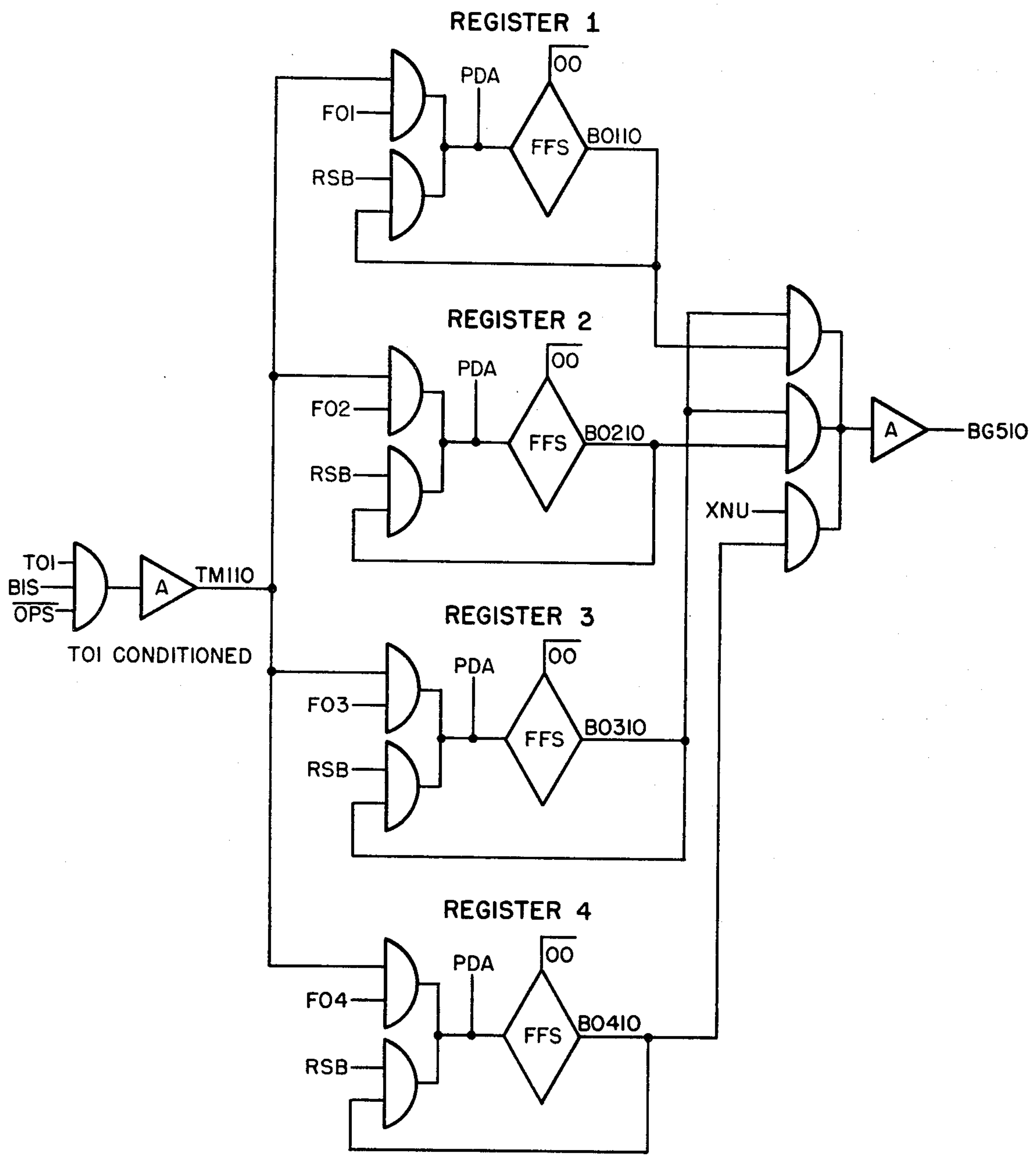
Figure 7F:
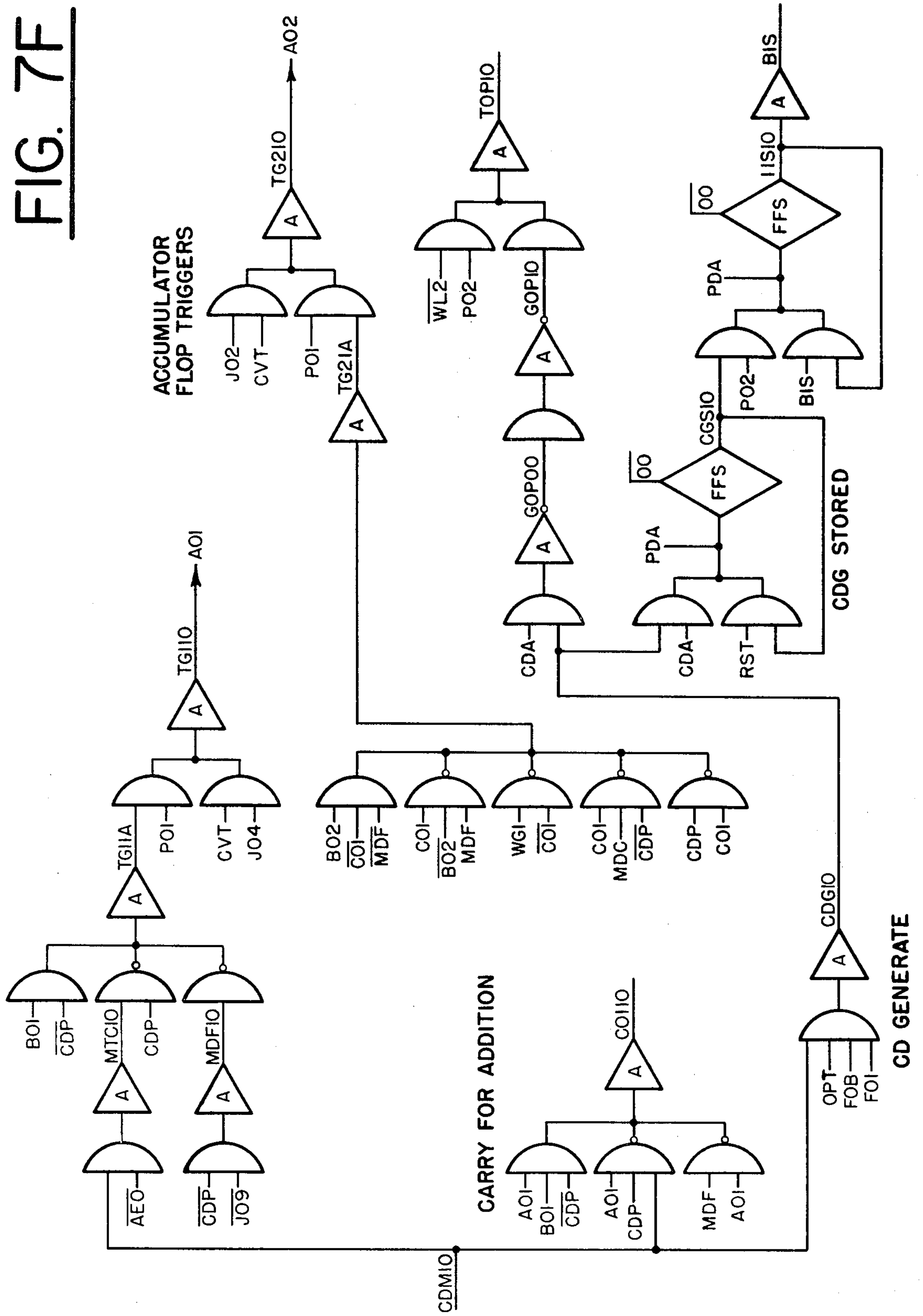
Figure 7G:
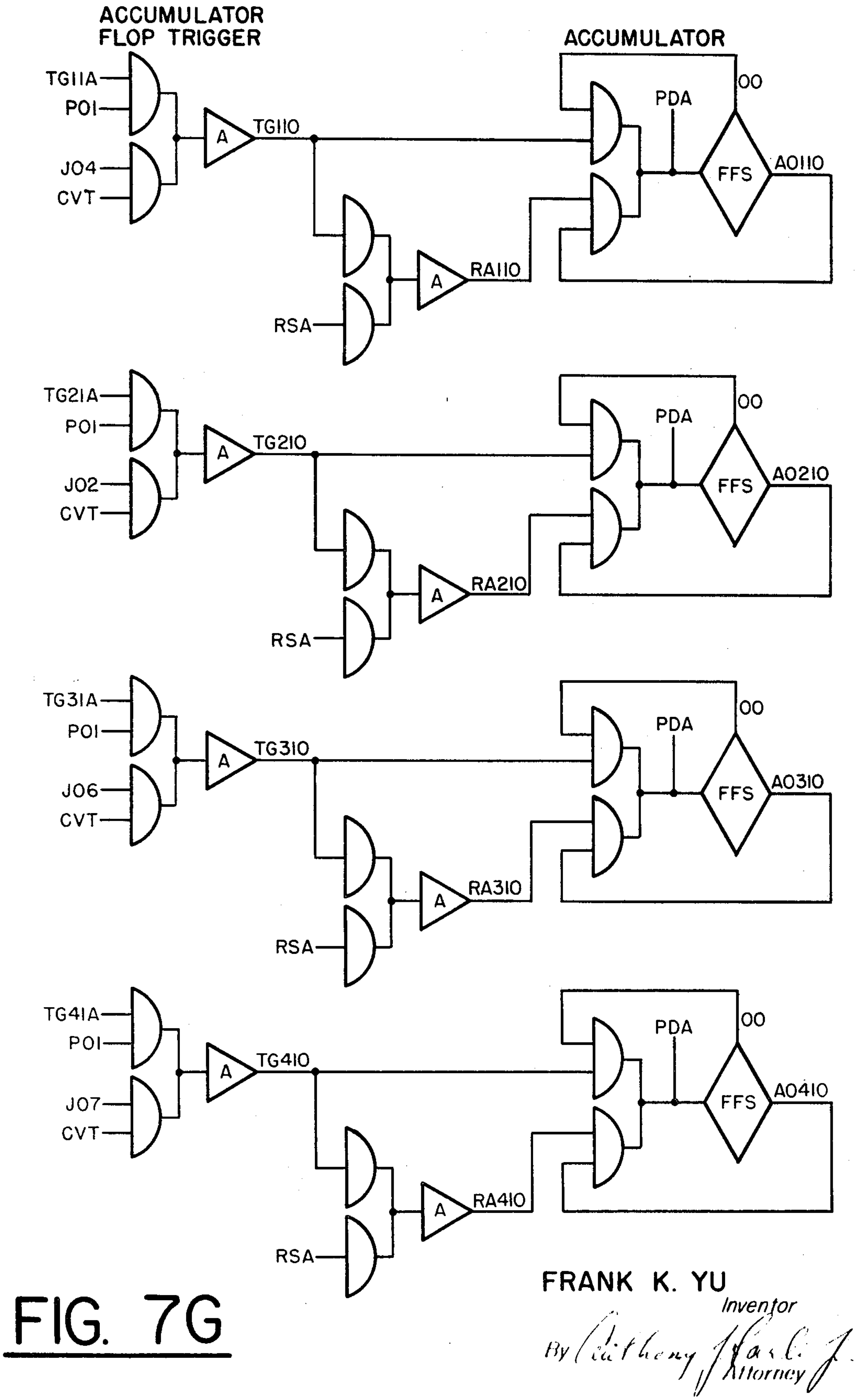
Figure 7H:
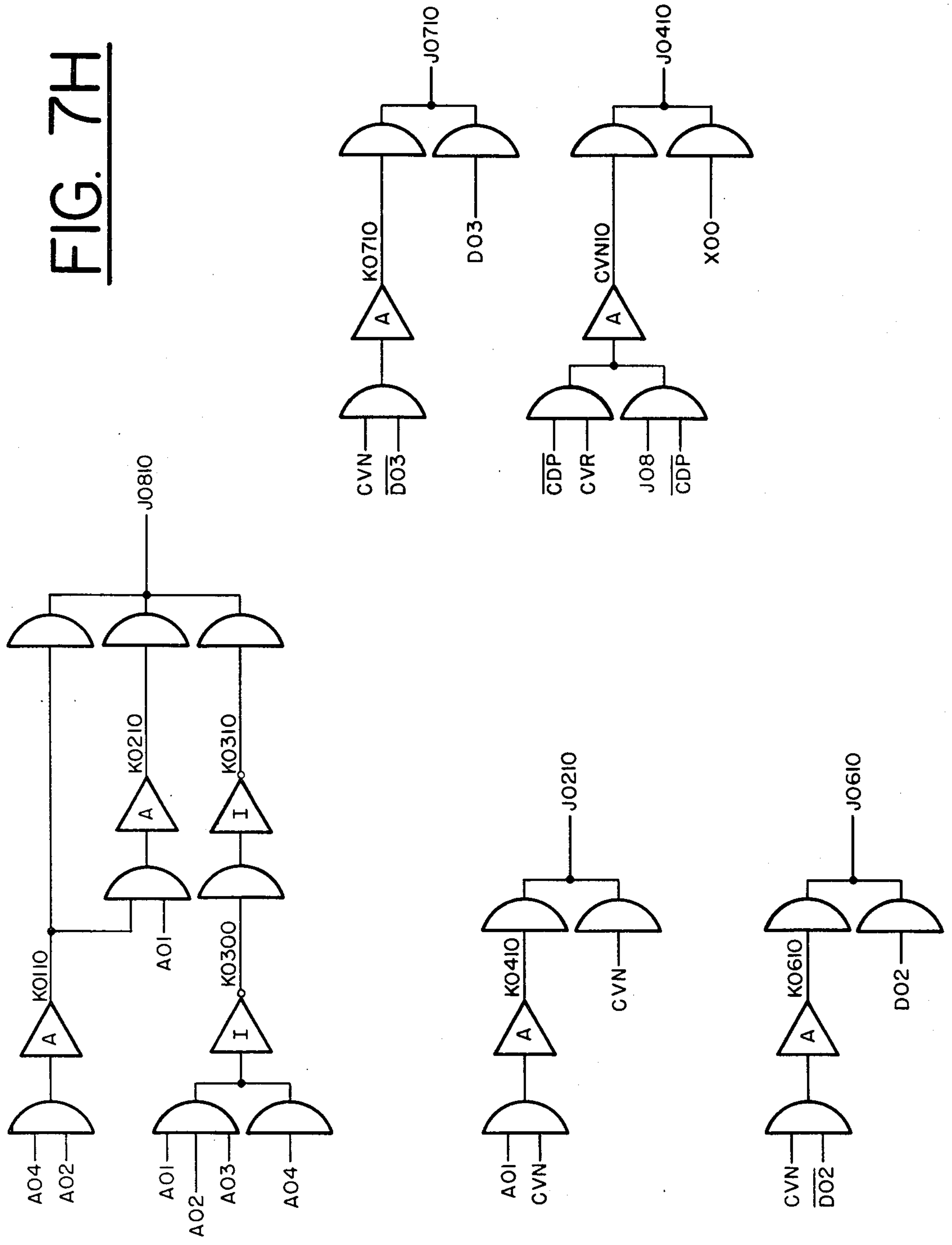
Figure 7J:
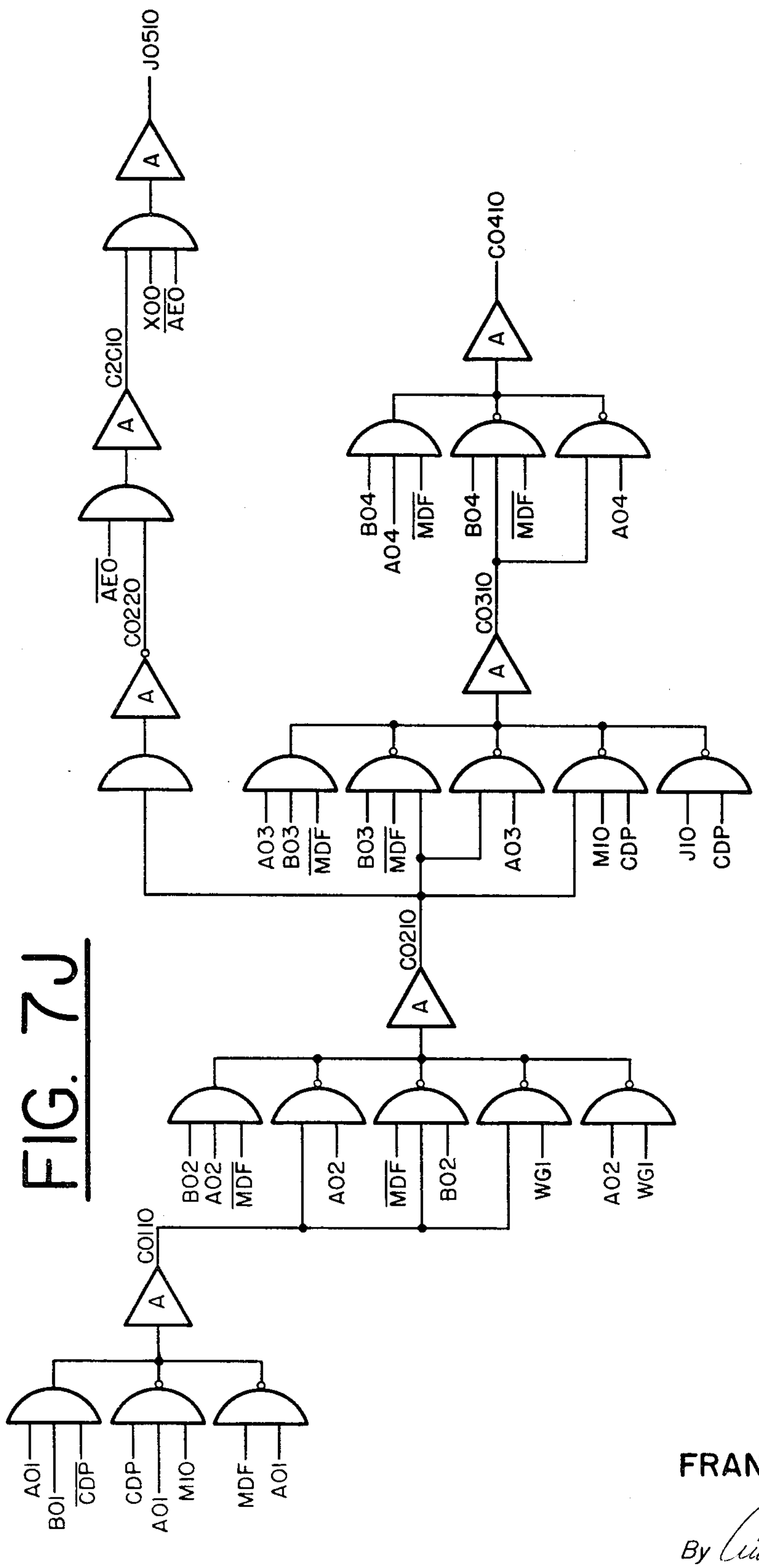
Figure 7K:
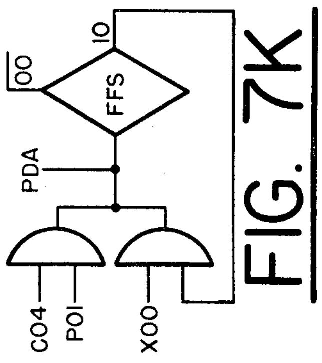
Figure 7I:
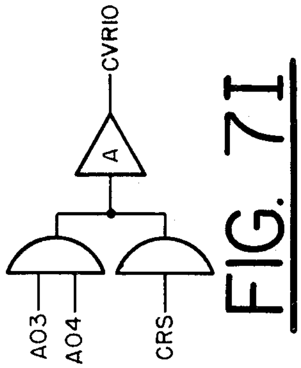
Figure 7L:
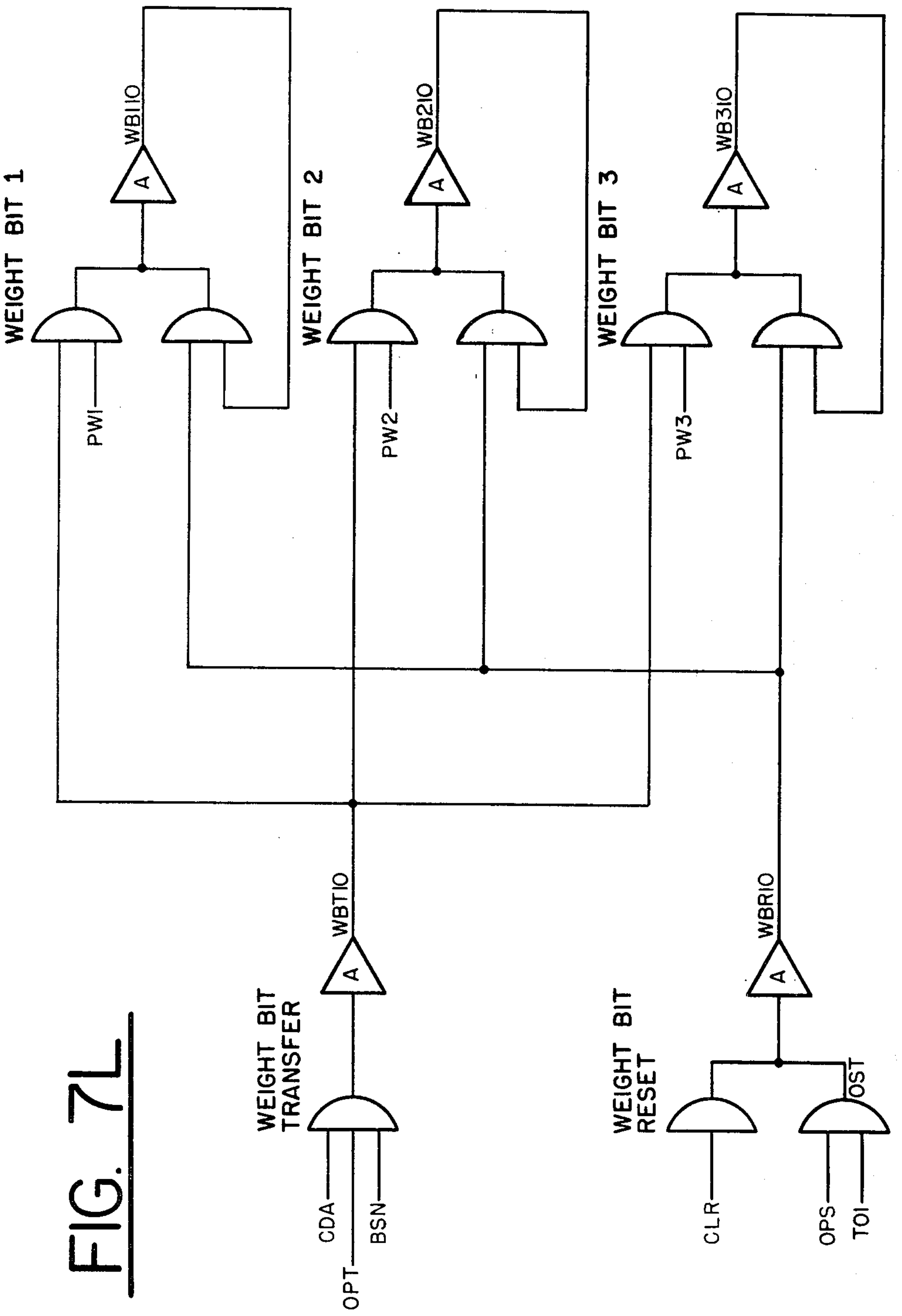
Figure 7M:
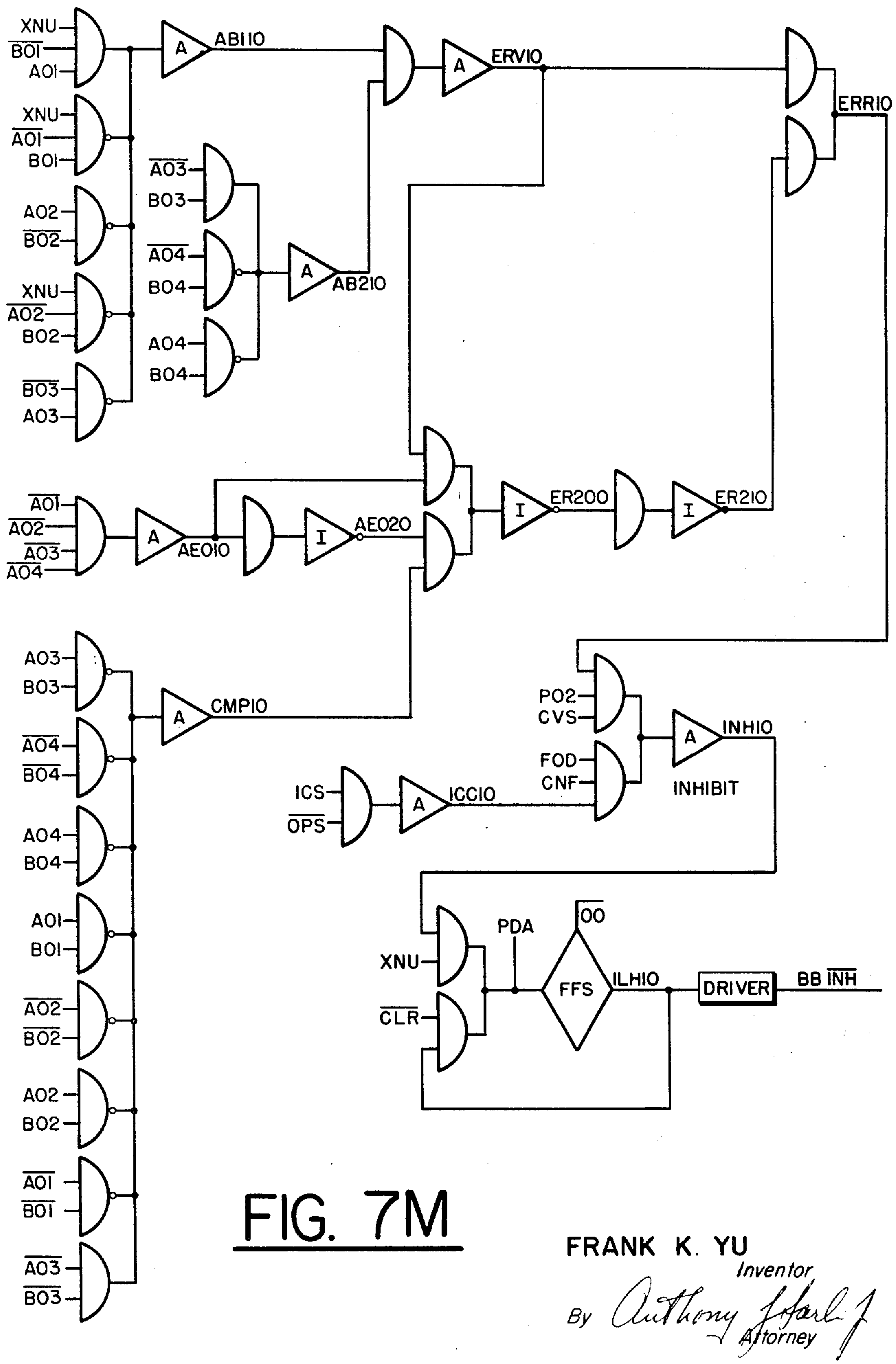
Figure 7N:
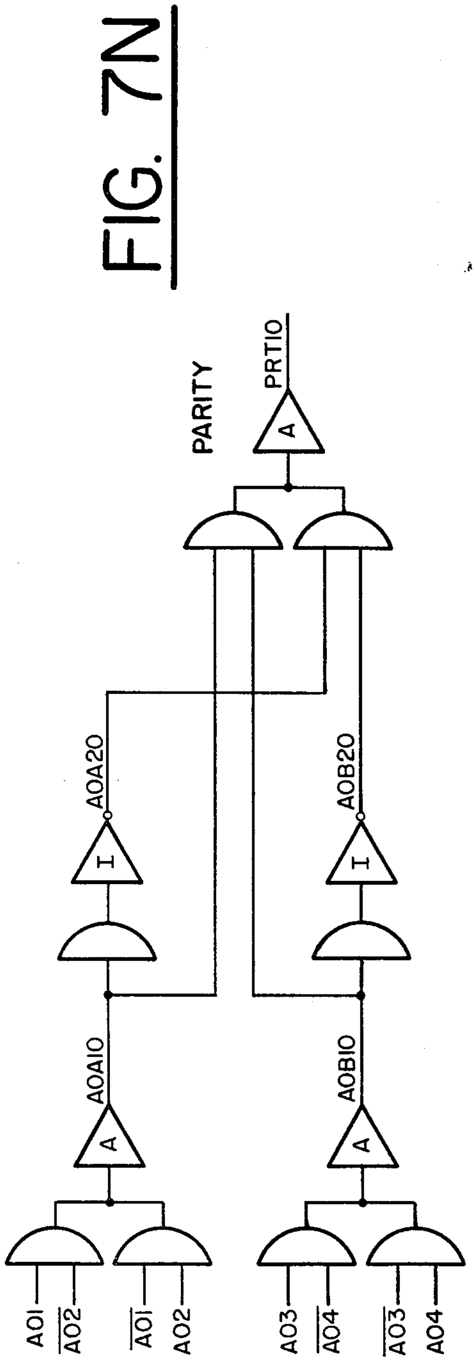
Figure 7O:
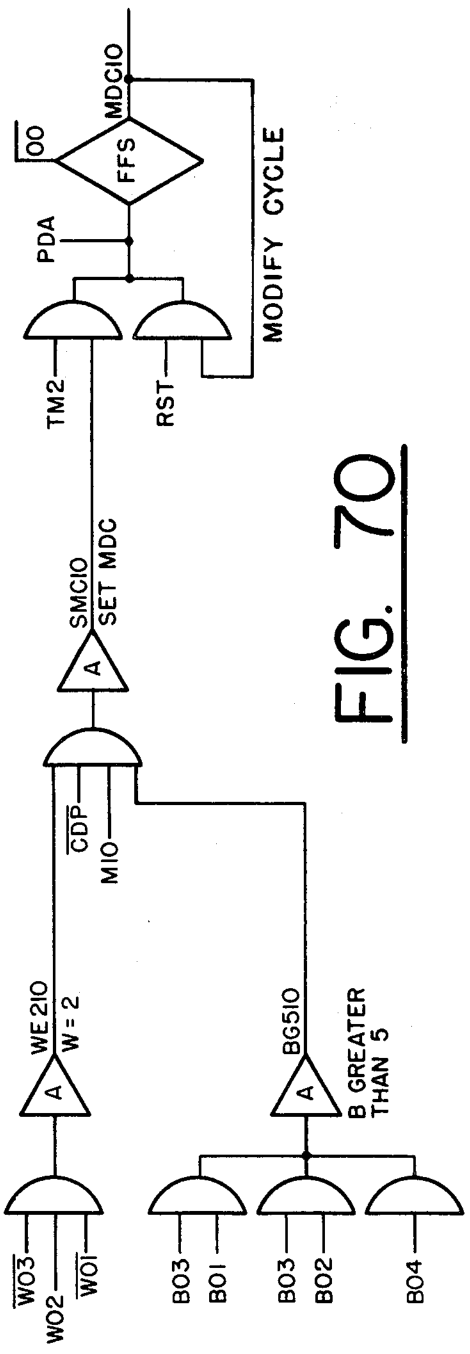
Figure 8:
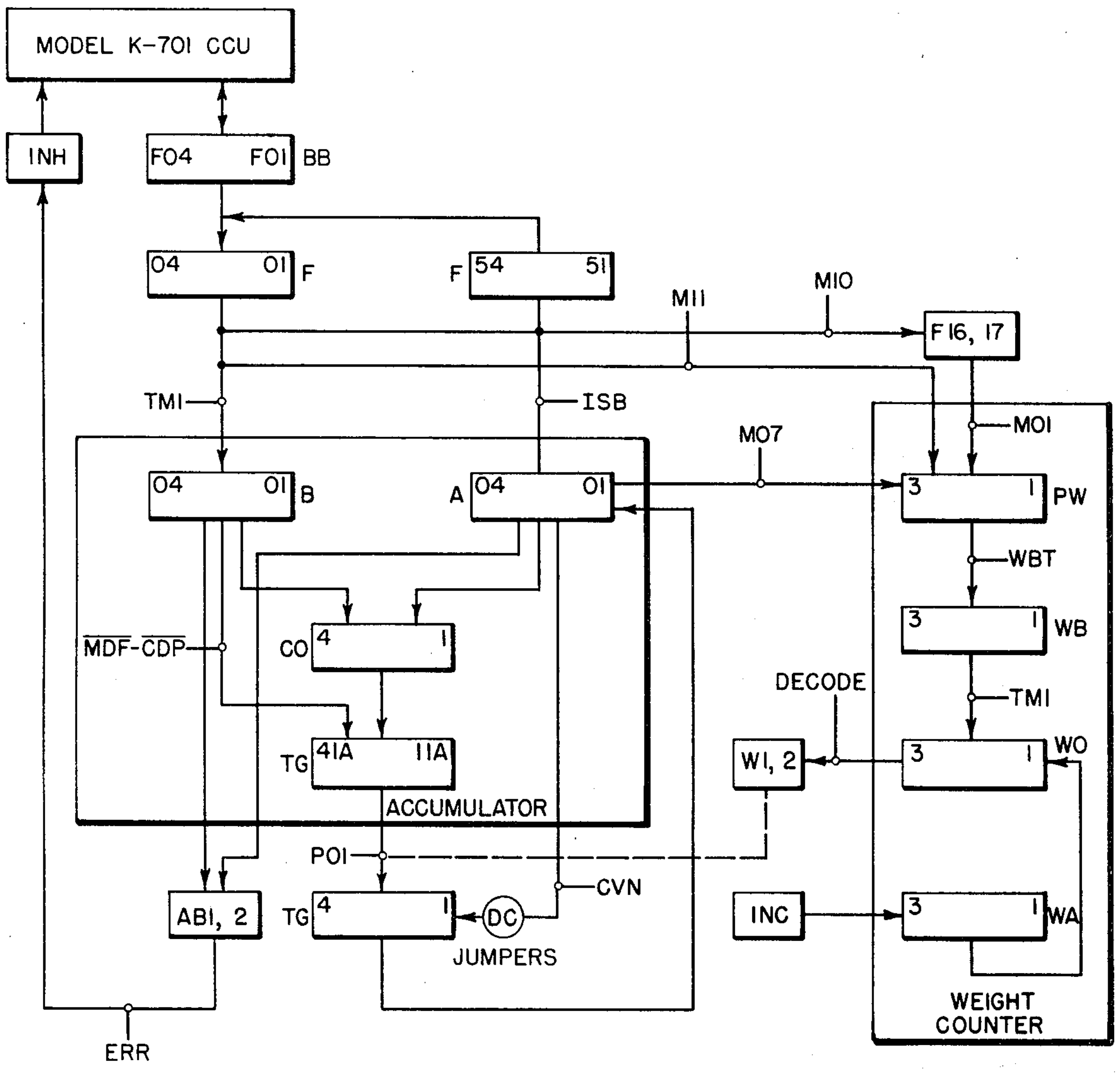
FIG. 8 is a logic flow diagram of a Modulo 10 self-check number device.

Reference is made to FIGS. 6A and 6B which are timing diagrams for address and termination timing of the DCA, FIG. 7 which shows in detail the logic of pertinent portions of the DCA, and FIG. 8 which is a logic flow diagram of Modulo 10 operation.

Depression of the "start" push button on the ACS control panel causes the traffic state counter to increment to Traffic State 2 (TS2). TS2 fires a 10 microsecond one-shot Address Strobe (ADS). ADS sends F02 across the I/O bus, and at the same time generates Address Time 1 (AT1). AT1 in turn brings AT2 high. FO2·AT2, and Data Entry/Data Verify Mode (WVM), set Check-digit Activated (CDA). CDA places the I/O bus Address Valid line (ADV) in an active state. (The ADV logic is not shown herein, but is similar to the ADV logic in the DCA described in the aforementioned co-pending application.) ADV causes the Traffic State generator to remain in TS2. CDA resets with Terminate One (TER1), which indicates that no further memory space is available.

Terminate Logic

When an Output Program Strobe (OPS) is transferred to the Self-Check Number DCA, and interface clock (T00, T01, T02) fires. OPS timed (OPT) sets at Time 2 (T02). In order to terminate, an OPS is transferred with F07; OPT and F07 allow TER to come high. TER then resets CDA and the I/O bus line ADV. The Traffic State Counter increments to Traffic State 3 (TS3). The interface clocking logic can be seen in FIG. 7, and particularly in FIG. 7B.

Base Number Program Bits

When a memory location in the CCU is addressed, the four program bits of that location are placed on the I/O bus via Output Program Strobe (OPS). As mentioned before, OPS fires the interface clock (T00, T01, T02). Time 1 (T01) sets and in turn allows Output Strobe Timed (OST). OST (FIG. 7L) clears the Weight Bit Register (WEB1–WB3). If a program pattern of $16_8$ or $17_8$ is detected, FOA sets (FIG. 7C). FOA in turn allows Base Number (BSN). OPT, CDA, and BSN set weight bit transfer (WBT) gate (FIG. 7L).

Program weight bits are loaded into the Weight Bit Register from the program decoders PW1 or PW2 (7C). These bits remain in WB1 or WB2 until the base number digit is strobed onto the I/O bus and then transferred to Weight Counter (W01, W02) at TM1. As each memory location is addressed, OPS in the CCU again sets, first the Weight Bit Register is cleared, and then the appropriate program bits are transferred to the Weight Bit register. With a program pattern of $16_8$ is sensed, a weight of 1 is assigned, while detection of program configuration of $17_8$ causes a weight of 2 to be assigned to the base number. If a program pattern of $00_8$ is sensed, no arithmetic operation is performed by the Check-Digit Adapter Logic.

Base Number Data Bits

Once the program bits have been read out of core memory and transferred to the DCA, the self-check adapter logic stalls until a data key on the keyboard is depressed. The CCU then enters a data output cycle (DOC); the six-bit data character is read out of memory, and Output Information Strobe (OIS) set. OIS in turn allows Bidirectional Information Strobe (BIS), indicating that the data character is on the I/O bus. Only data bits F01–F04 are sampled by the Self-Check Number logic, as all numbers in the commonly used data codes are identified only by the lower order four bit. A program configuration of $16_8$ or $17_8$ indicates that a base number digit is available on the bus. Base/check digit (BCD) has previously set via BSN and CDA (FIG. 7B). OPT and BCD allow BCD stored (BCS). When BIS strobes data along, BIS and BCS fire the interface clock. T01 and BIS cause T01 conditioned (TM1) to come high, OPS having been reset in the CCU by the keyboard strobe KBKBS. TM1 gates the digit from F01–F04, (the bus multifunction lines) into the B register (B01–B04) (FIG. 7E). The base number digit can be any decimal number from 0–9. TM1 also transfers the program weight bit into the Weight Counter (W01 or W02) (FIG. 7D). B01–B04 are gated into the Accumulator Flip-Flop Triggers (TG1–TG4) through back-up triggering gates (TG11A–TG41A, FIG. 7F) under appropriate conditions. The TG triggers then strobe the data bits (B01–B04) together with internally generated carries (if any) into the Accumulator (A01–A04) (FIG. 7G) via pulse time 1 (P01).

Modulo 10 Decimal Conversion

Modulo 10 decimal conversion occurs when the decimal value in the Accumulator is 10 or greater. Modulo 10 decimal conversion is essentially the adding of 6 to the Accumulator contents. Conversion is performed under the following three conditions:

1. When both A04 and A02 are high, K01 sets which, via J08, brings Conversion (CVN) high when $\overline{CDP}$ is high (FIG. 7H), ($\overline{CDP}$ high means that this digit is not at Check-Digit Position but a digit of base number);
2. When both A04 and A03 are high, CVR sets (FIG. 7I) which, together with $\overline{CDP}$, brings Conversion (CVN) high;
3. When a binary carry occurred during operation on a previous digit, Carry Stored (CRS) sets CVR (FIG. 7I), which, together with $\overline{CDP}$, brings Conversion (CVN) high.

Check-Digit Program Bits

The output program strobe (OPS) in the CCU sets to indicate that the program bits are on the I/O bus. When a program pattern $10_8$ is sensed, FOB and $\overline{F01}$ are true; and as described before, OPS fires the interface clock (T00, T01, and T02) (see FIG. 7B). OPS at Time 2 sets OPT. The OPT, CDA, FOB, and $\overline{F01}$ brings Check-Digit Validate (CDV) high which sets BCD and in turn allow BCD stored (BCS) (FIG. 7B).

Check-Digit Data Bits

When the self-check number system is operating in validate mode, and while the source document check-digit is keyed into the buffer memory from the keyboard, BIS is set. BCS and BIS allow TOF to fire the interface clock for second time. With time 1 (T01) high, TM1 sets. TM1 gates the check-digit from bus lines F01–F04 to the B register (B01–B04) (FIG. 7E). Usually, at a base number digit location, TM1 gates the Weight bits into Weight Counter (W01–W03) also FIG. 7D), and the B register contents are added to the Accumulator. However, this is the check-digit location in the CCU, so the weight bits are not gated into Weight Counter and the B register contents are not added to the Accumulator A01–A04 but are used to compare with the calculated check-digit in the Accumulator. If the contents of A01–A04 do not compare with the keyed-in check-digit, AB1 and/or AB2 come high (FIG. 7N). AB1 and/or AB2 set Error-Validating (ERV). ERV bring Error (ERR) high. A non-compare indication is then transferred to the CCU via Inhibit (INH) function.

CHECK-DIGIT GENERATION

If the Self-Check Number DCA is operating in the Generate Mode, the CCU sets OPS and sends the program bits from the addressed memory location to the DCA and fires the DCA interface clock (FIG. 7A). At Time 2 (T02) OPS times (OPT) sets. If the program code is $11_8$, Check-Digit Generate (CDG) (FIG. 7F) comes high. CDG and CDA set Check-Digit Stored (CGS). CGS and Operating Pulse Two (P02) allows IIS. If the Accumulator register A01–A04 is not equal to 0, IIS sets ISB which then gates the data bits F51–F54 onto the I/O bus. FIG. 7O shows a parity generator for generating odd parity which is also sent out on the I/O bus along with the check-digit.

MODIFY CYCLE

Modify cycle (MDC) sets to indicate an odd position digit of the base number, with a weight of two assigned to it. Therefore, when the output of the B register is greater than 5, (BG5) becomes high, (FIG. 7P), and W=2(WE2, and not check-digit position ($\overline{CDP}$) come high, then (SMC) sets. SMC and Time T2 Conditioned (TM2) allows Modify Cycle MDC to be set. When MDC sets, a carry should be added to Accumulator. C04 is then added to A01 for calculation.

Example of Modulo 10 Self-Check Number Calculation

TABLE 2

| | | | | |
|---|---|---|---|---|
| LOCATION | 21 | 22 | 23 | 24 |
| PROGRAM | 17 | 16 | 17 | 10 |
| BASE NUMBER | 5 | 6 | 2 | — |
| WEIGHT | 2 | 1 | 2 | — |

| | DECIMAL | CALCULATION | |
|---|---|---|---|
| 2 | 5 | 0101 | |
| 1 | 5 | +0101 | |
| | | 1010 | |
| 0 | | +0110 | DC |
| | | 0000 | |
| | | +0001 | Carry |
| | | 0001 | |
| 1 | 6 | +0110 | |
| | | 0111 | |
| 2 | 2 | +0010 | |
| | | 1001 | |
| 1 | 2 | +0010 | |
| | | 1011 | |
| 0 | | +0110 | DC |
| | | 0001 | |
| | Tens Complement of One is Nine. Check Digit Equals Nine. | | |

As an example of the calculations carried out in computing a Modulo 10 check digit, Table 2 shows a base number of 562 in memory locations 21–23. When memory location 21 is addressed, program code $17_8$ is decoded, and a weight of two is assigned to the base number 5. Program pattern $17_8$ indicates an odd digit base number which is assigned a weight of two. The base number in each location is added to the Accumulator (A01–A04) as many time as as the assigned weight indicates. A five is loaded into the Accumulator and a second five is added to it, the added result being ten. The weight counter is decremented to 0. As the contents of A.1–A04 are greater than or equal to 10, a decimal-correct operation is required. Modulo 10 decimal correction is, essentially, the adding of a 6 to the Accumulator contents. A 6 is therefore added to 10 and a result of 1 is obtained.

A Carry (C04) is now set and a One bit is propagated to A01. Program bits for location 22 are decoded and a weight of one is assigned to the base number of six. A program pattern of $16_8$ indicates an even digit base number which assigns a weight of one. The accumulator content one, now has a six added to it. The weight counter decrements to zero; A01–A04 contain a seven. Memory location 23 is addressed and a program pattern of $17_8$ is decoded. A weight of two is assigned to the base number two. The number two is added to the accumulator contents of seven. The weight counter decrements to one, and a total of nine is present in A01–A04. Two is added to nine and the weight counter decrement to zero. The accumulator result is 11. Since a decimal correction is necessary, a six is added to 11 and a result of 1 is obtained. The check-digit is obtained by complementing one. Nine is the correct Self-Check digit.

MODULO 11 OPERATION

As an alternative embodiment, the self-check number DCA may operate in Modulo 11 with the same basic logic as is used in Modulo 10. The few changes in the logic required would be obvious to one skilled in the art, since the check number system is based on the same basic hardware such as the Weight Bit register, Weight Counter, B register, Accumulator, Etc.

Figure 9:
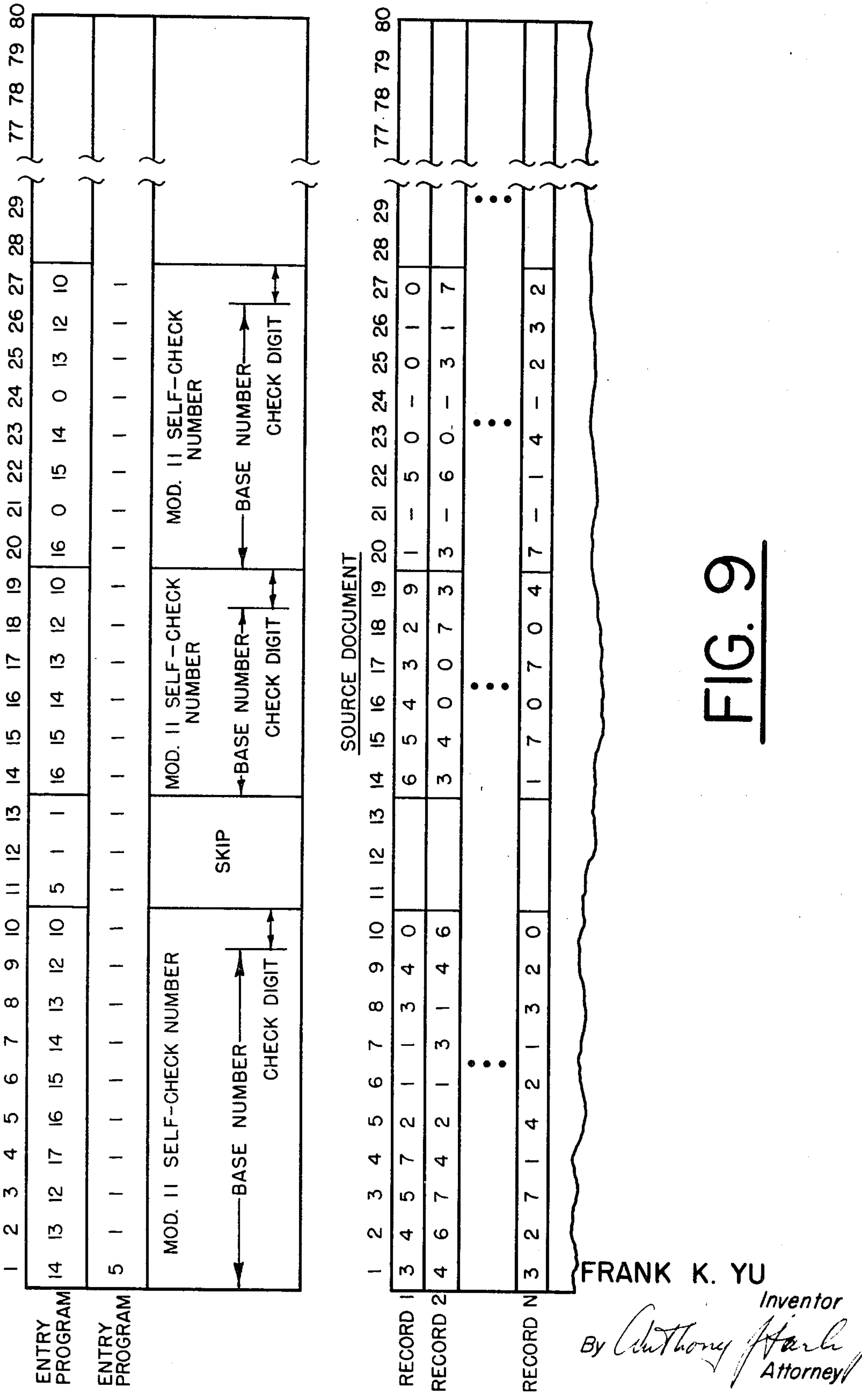
FIG. 9 is an example of a Modulo 11 program set-up.

FIG. 9 illustrates a source document containing three self-check number fields in each unit record for Modulo 11 check number calculation. The program pattern used in the data entry program shows the weighting factor assigned to each data digit in the base number. The weighting factor is the units position of each number in the data entry program code; data entry program code $10_8$ designates the check digit position. The third field (locations 20–27), contains dashes as separators in the base number. Dash positions are not considered in the calculation of the check digit value or in the assignment of weighting factors. Verification of a Modulo 11 self-check number field in the data verify mode is not required. It is therefore desirable to ignore the field, and the self-check number field is programmed for an automatic skip ($05_8$) operation during the data verify mode.

Table 3 lists the program patterns assigned to the CCU for Modulo 11 operation of the self-check number DCA.

TABLE 3 Modulo 11 Program Patterns

| PATTERN | PROGRAM BITS $P_4$ | $P_3$ | $P_2$ | $P_1$ | DESCRIPTION |
|---|---|---|---|---|---|
| 00 | 0 | 0 | 0 | 0 | Signifies a special character position in the base number of a Self-Check Number field. These characters are not considered in generating the check value. |
| 10 | 1 | 0 | 0 | 0 | Indicates the check digit position of the Self-Check Number field. |
| 12 | 1 | 0 | 1 | 0 | Indicates a weighting factor of two assigned to the units position of the base number. |
| 13 | 1 | 0 | 1 | 1 | Indicates a weighting factor of three assigned to the tens position of the base number. |
| 14 | 1 | 1 | 0 | 0 | Indicates a weighting factor of four assigned to the hundreds position of the base number. |
| 15 | 1 | 1 | 0 | 1 | Indicates a weighting factor of five assigned to the thousands position of the base number. |
| 16 | 1 | 1 | 1 | 0 | Indicates a weighting factor of six assigned to the ten thousands position of the base number. |
| 17 | 1 | 1 | 1 | 1 | Indicates a weighting factor of seven assigned to the hundred thousands position of the base number. |

Figure 10:
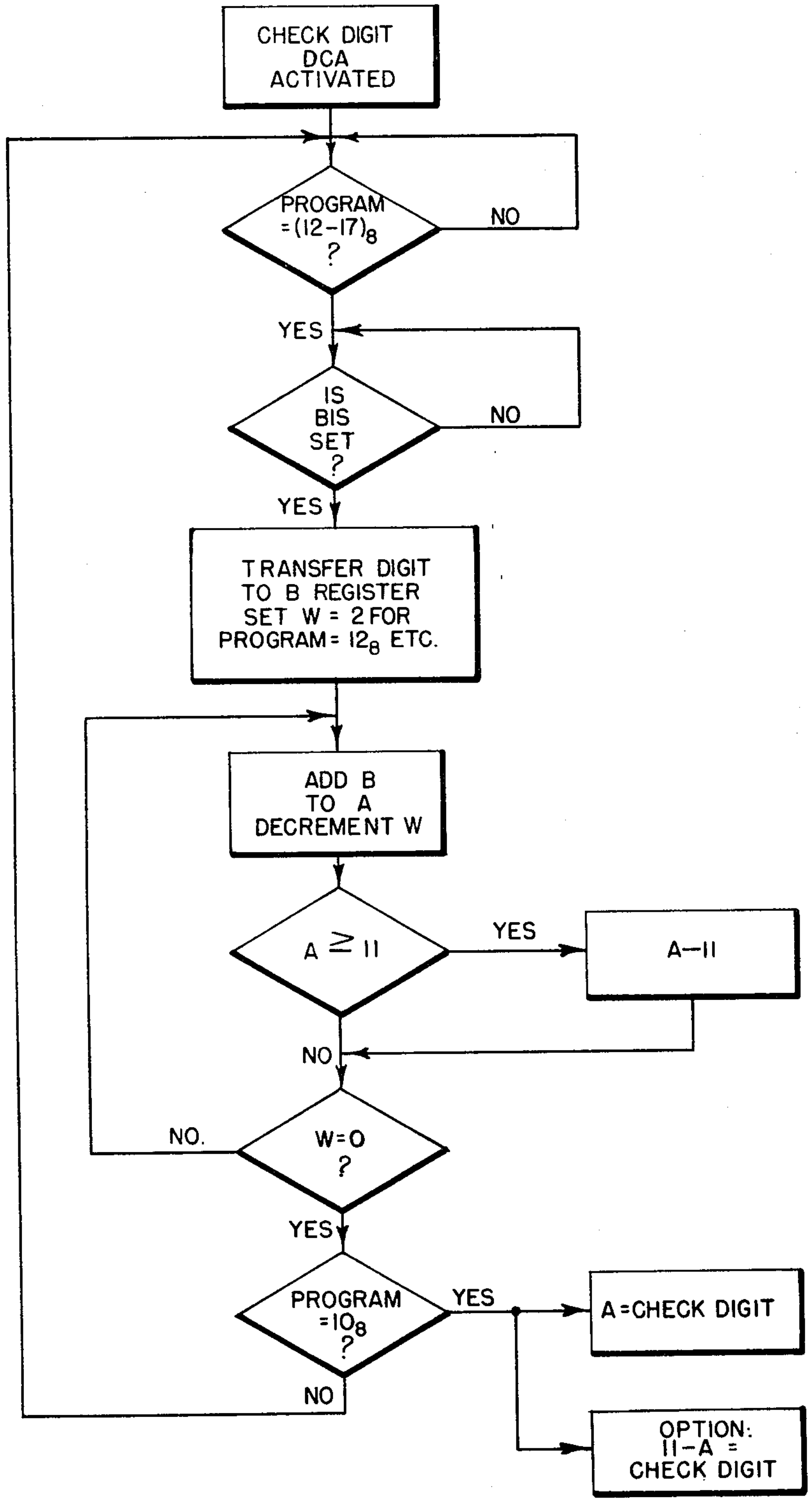
FIG. 10 is a flow diagram of a Modulo 11 check-digit device.

FIG. 10 is a flow diagram showing the Modulo 11 check-digit generation. When the check-digit DCA is activated, the program bits are examined. With a program configuration of $12_8$ through $17_8$, BIS, the Bidirectional Information Strobe fires the interface clock and T01 sets TM1 which gates the base number digit into the B register (B01–B04). Each digit of the base number is added to the Accumulator (A01–A04) as many times as indicated by its weight. For example, if the program bits are equal to $12_8$, the weight counter (W01–W03) is set to 2. The B register contents are added to the Accumulator and the Weight Counter is decremented. An accumulator check is now performed and if the Accumulator contents are greater than or equal to 11, 11 is subtracted from the Accumulator. In the Modulo 11 system, the subtraction operation is actually performed by adding 5 to the Accumulator and ignoring the produced binary carry. If the Weight Counter does not equal 0, the digit in the B register is again added to the Accumulator. The preceding sequence is repeated until the digit has been added to the Accumulator the number of times indicated by the digit program configuration. If Weight Counter Equals zero (W=0) is set and the next program configuration is equal to $10_8$, the Accumulator contains the final check-digit. An optional check-digit may be made by subtracting 11 from the final Accumulator result.

Table 4 shows a base number of 842 in memory locations 25 through 27.

TABLE 4 Modulo 11 Check Digit Calculation

| LOCATION | 25 | 26 | 27 | 28 |
|---|---|---|---|---|
| PROGRAM | 14 | 13 | 12 | 10 |
| BASE NUMBER | 8 | 4 | 2 | |
| WEIGHT | 4 | 3 | 2 | |

| | DECIMAL | CALCULATION |
|---|---|---|
| 4 | 8 | 1000 |
| 3 | 8 | +1000 |
| | | 0000 |
| | | +0101 DC |
| | | 0101 |
| 2 | 8 | +1000 |
| | | 1101 |
| | | +0101 DC |
| | | 0010 |
| 1 | 8 | +1000 |
| | | 1010 |
| 3 | 4 | +0100 |
| | | 1110 |
| | | +0101 DC |

| | | |
|---|---|---|
| | | 0011 |
| 2 | 4 | +0100 |
| | | 0111 |
| 1 | 4 | +0100 |
| | | 1011 |
| | | +0101 DC |
| | | 0000 |
| 2 | 2 | +0010 |
| | | 0010 |
| 1 | 2 | +0010 |
| | | 0100 |
| | | Check Digit Equal Four. Optional Check Digit: 11-4 Equals 7. Check Digit Equals Seven. |

When memory location 25 is addressed, program code $14_8$ is decoded and a weight of four is assigned to the base number eight. The base number in each location added to the Accumulator (A01–A04) as many times as the assigned weight indicates. An eight is loaded into the Accumulator, and then a second eight is added to it. The added result is 16 with a Carry (C04) being produced. C04 initiates a decimal-correct operation and a five is added to the Accumulator. The carry (C04) is ignored. Eight is now added to the five in A01–A04 and the decimal result is 13. The number 13 is converted to a 2. Eight is now added to the result of 2 and the Weight Counter decrements to 0, the additive result being 10. Decimal correction is not performed since the accumulative contents are less than 11. Program bits for location 26 are then decoded and a weight of three is assigned to the base number of four. Four is added to 10 and a result of 14 occurs; the weight counter is decremented to 3. The number 14 as converted to a 3. Four is again added to the Accumulator contents of 3 obtaining a result of 7. Once more, 4 is added to the Accumulator register and 11 results in the Accumulator, the Weight Counter decrementing to 0. Decimal conversion occurs again with a zero result now in the Accumulator. Location 27 program bits are read out and decoded. A weight of 2 is assigned to the base number of 2, therefore, the number 2 is added to the zero Accumulator contents; the Weight Counter is decremented to 1 and another 2 is added to the Accumulator for a result of 4. Since the weight counter is now at 0, the Accumulator contains the correct check-digit of four.

MODULO 7 OPERATION

As still another alternative embodiment, the Self-Check Number DCA may operate in Modulo 7 with the same basic logic as is used in Modulo 10. Again, the changes in the logic required would be obvious to one skilled in the art, since the check number system is based on the same basic hardware as in the previous examples.

Figure 11:
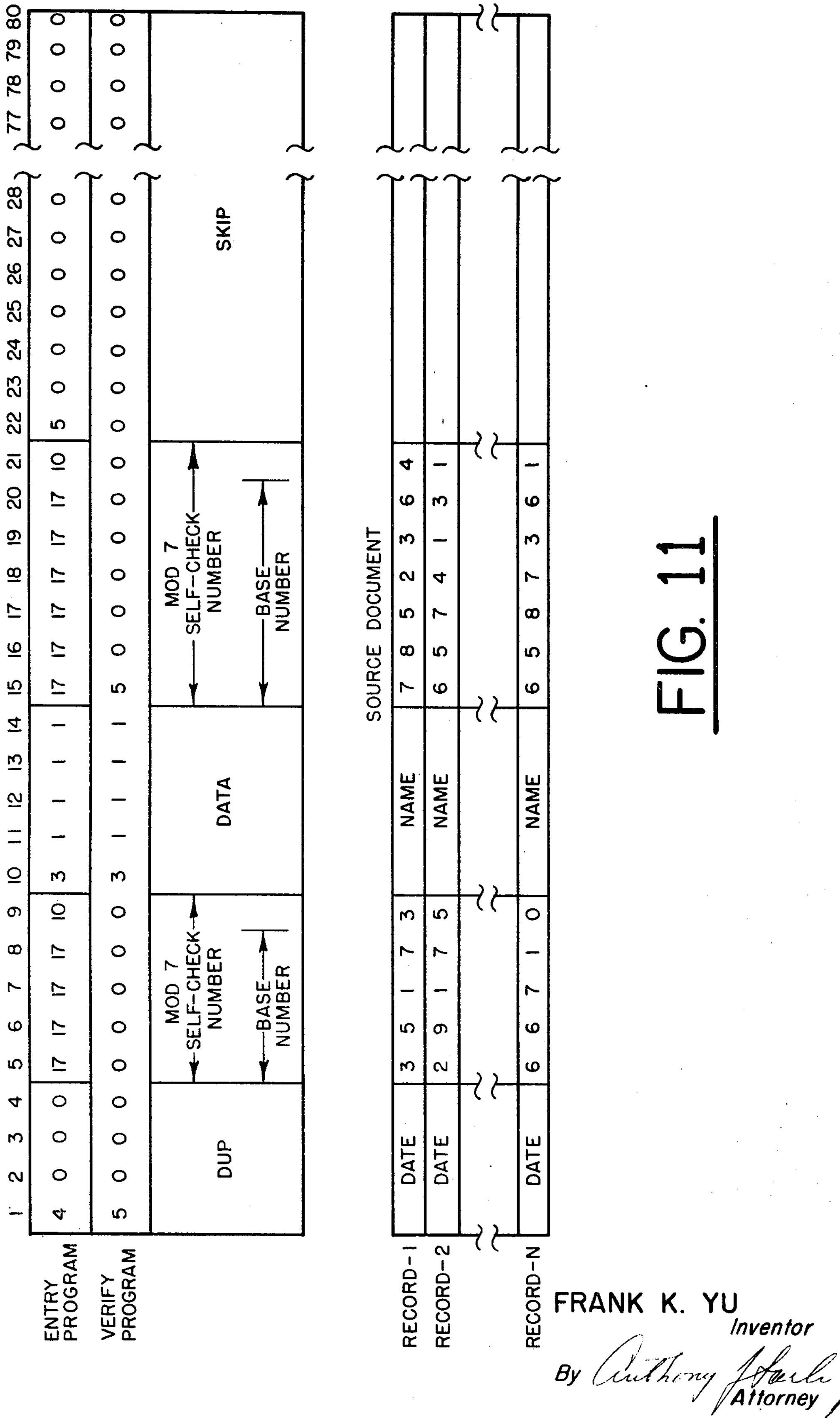
FIG. 11 is an example of a Modulo 7 program set-up.

FIG. 11 illustrates a source document containing two self-check number fields in each unit record for Modulo 7 check number validation. The self-check number in Modulo 7 operation is validated in Data Entry Mode. Verification of the self-check number is therefore not required in the Data Verify Mode of operation.

Table 5 lists the program patterns assigned to the CCU for Modulo 7 operation of the self-check number DCA.

TABLE 5 Modulo 7 Program Patterns

| OCTAL PATTERN | PROGRAM BITS $P_4$ | $P_3$ | $P_2$ | $P_1$ | DESCRIPTION |
|---|---|---|---|---|---|
| 00 | 0 | 0 | 0 | 0 | Signifies a character position in the base number not to be considered in the check-digit calculation. ($0_8$ cannot be the units position of a check number field.) This conditions the Model **714** for an upper position character. |
| 10 | 1 | 0 | 0 | 0 | Indicates the check digit position of the Modulo 7 Self-Check Number. $10_8$ is an Upper MSP. |
| 17 | 1 | 1 | 1 | 1 | Indicates a character within the Modulo 7 Self-Check Number field. $17_8$ is an Upper MSP. |

Figure 12:
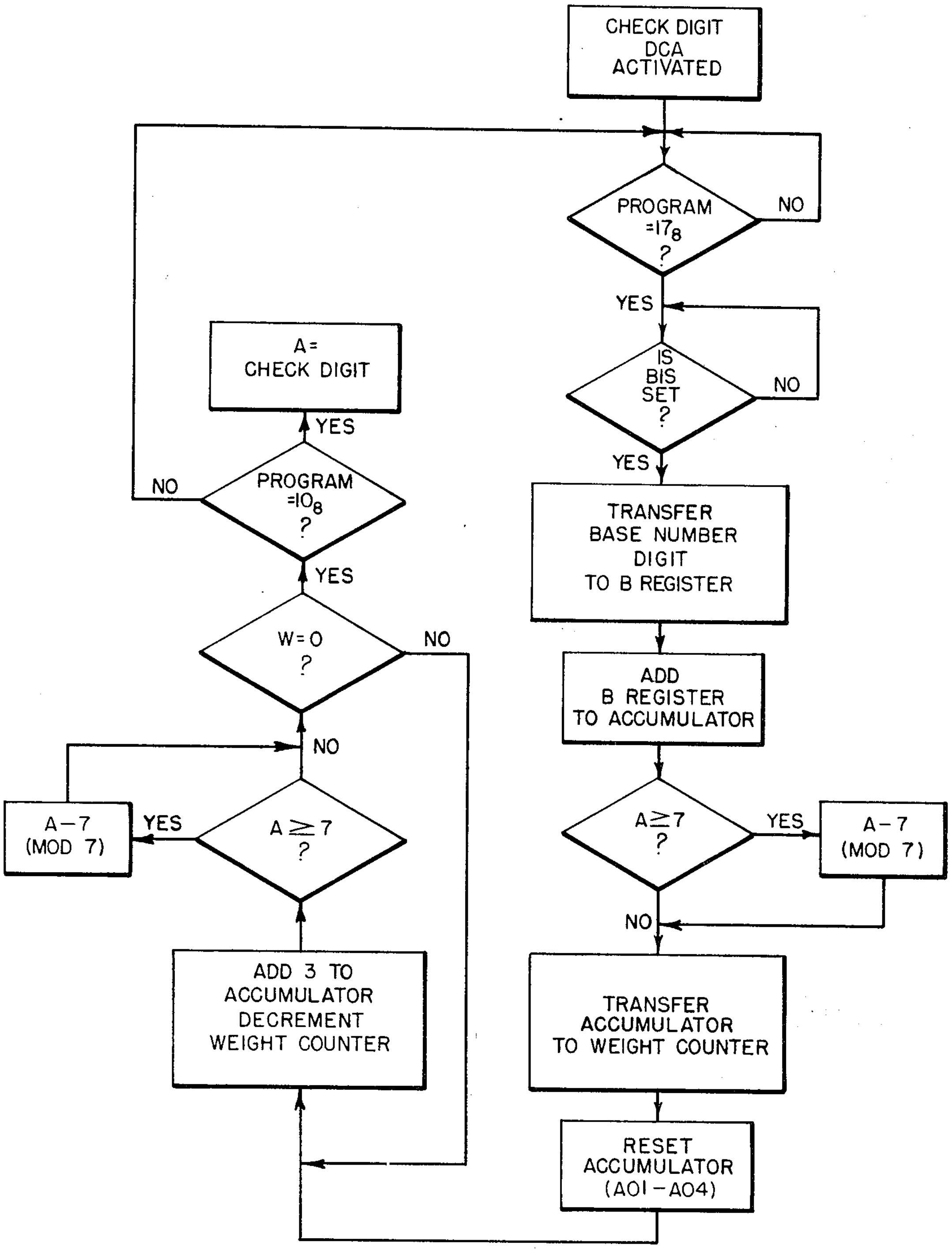
FIG. 12 is a flow diagram of a Modulo 7 check-digit device.

FIG. 12 is a flow diagram showing the Modulo 7 check-digit generation. When the check-digit DCA is activated, the program bits are examined. BIS sets with a program bit configuration of $17_8$ and transfers the base number digit to the B register (B01–B04). Each digit of the base number is added to the Accumulator (A01–A.4), and the result is examined by the DCA logic. In the Modulo 7 check-digit system the division of a base number by 7 is accomplished by a repetitive subtraction operation: If the Accumulator contains a digit greater than or equal to 7, the DCA logic subtracts 7 from A01–A04. The remainder is considered the tens digit of the next number to be divided. The accumulator configuration is then transferred to the weight counter (W01–W03). If A01–A04 contains a digit less than 7, a straight transfer from the Accumulator to the weight counter is performed. For each 10 divided by 7 a remainder of 3 is the result. Three is therefore added to the Accumulator, which now also contains the units digit. The weigh counter is decremented by 1. The Accumulator contents are monitored and the subtraction process repeated until the weight counter equals 0. A program bit check is then initiated for a value of $10_8$, which signified the check-digit position location in memory. The Modulo 7 check-digit is the Accumulator contents and A01–A04 are gated into the correct core memory location. If a program configuration of $17_8$ is sensed, the entire operation is repeated for another base number digit.

Table 6 shows a base number of 432 in memory locations 13–15.

TABLE 6 Modulo 7 Check Digit Calculation

| LOCATION | 13 | 14 | 15 | 16 |
|---|---|---|---|---|
| PROGRAM | 17 17 | | 17 | 10 |
| BASE NUMBER | 4 | 3 | 2 | |
| WEIGHT | 1 | 1 | 1 | |

| | DECIMAL | CALCULATION | |
|---|---|---|---|
| 4 | 4 | 0100 | |
| | | 0000 | Reset A |
| 3 | | 0011 | |
| 2 | | +0011 | |
| | | 0110 | |
| 1 | | +0011 | |
| | | 1001 | |
| | | +1001 | DC |
| | | 0010 | |
| 0 | | +0011 | |
| | | 0101 | |
| | 3 | +0011 | B to A |
| | | 1000 | |
| | | +1001 | DC |
| 1 | | 0001 | |
| | | 0000 | Reset A |
| 0 | | +0011 | |
| | | 0011 | |
| | 2 | +0010 | B to A |
| | | 0101 | |
| | | Check Digit Equals Five. | |

When memory location 13 is addressed, program code $17_8$ is decoded. The base number of four is loaded into the B register (B01–B04). A weight of 4 is then transferred to the weight counter (W01–W03) and A01–A04 are reset. Three is added to the accumulator and the weight counter is decremented to 3. A second 3 is added to A.1–A04 and W01–W03 decrements to 2. The accumulator now holds a 6. The number 3 is again added to the accumulator and the weight counter decrements to 1. Since the accumulator now contains the decimal number 9, a decimal-correct operation is required. Modulo 7 decimal correction is essentially the adding of 9 to the accumulator contents. When the decimal-correct 9 is added to 9, the accumulator contains a 2. A carry (C04) is generated and ignored. Three is again added to the accumulator contents and the weight counter is decremented to 0. The contents of A01–A04 is now 5. Memory location 14 is addressed and a program configuration of $17_8$ is detected. The base number 3 is loaded into the B register and then transferred to the Accumulator. Three is added to the Accumulator content of 5, to obtain a result of 8. Since the Accumulator contents are now greater than 7, another decimal-correct operation is required. Nine is added to the Accumulator contents, the carry ignored, and a result of 1 is thus generated. One is loaded into W01–W03 and A.1–A.4 is reset to 0. Three is added to the Accumulator and the weight counter is decremented to 0. A01–A04 now contain a 3. When memory location 15 is addressed, a program code of $17_8$ is sensed and the base number of 2 is transferred into the B register and then added to the Accumulator contents. The result 5, is the check-digit.

While the invention has been shown and its operation described with reference to specific embodiments, the principles of the invention may be applicable to a variety of other applications or algorithms. Other modifications of this system will become apparent to those skilled in the art, and the specification is not intended to be limited to those applications specifically described.

I claim:

1. In a data processing system having means for generating program signals and data signals, a data verification device comprising:

a. a register for receiving said data signals,
b. an accumulator,
c. means connecting said register and said accumulator,
d. a comparator,
e. means connecting said register and said comparator, and
f. means responsive to said program signals for transferring said data signals from said register to said accumulator or for transferring said data signal to said comparator.

2. A system as set forth in claim 1 wherein said means responsive to said program signals is a program decoder.

3. A system as set forth in claim 2 further comprising a weight counter and means responsive to said weight counter for causing the contents of said register to be transferred to said accumulator a plurality of times.

4. A system as set forth in claim 3 where the number of said transfers is established by said program decoder.

5. A system as set forth in claim 4 wherein an input to said weight counter is connected to an output of said accumulator and wherein the contents of said accumulator change the contents of said weight counter.

6. A system as set forth in claim 1 wherein said program signals establish the existence of a check-digit in said accumulator.

7. A system as set forth in claim 1 wherein said means for generating program signals and data signals generates said signals alternately.

8. A system as set forth in claim 2 further comprising an input/output bus, said program signals and said data signals being carried on said bus.

9. A system as set forth in claim 8 wherein a check digit may be generated by said data verification device.

10. In a data entry system comprising a central control unit, said central control unit providing program information, a peripheral input device and a bus connecting said input device and said central control unit:

a. generating means connected to said bus.
b. said generating means responsive to said program information on said bus to perform arithmetic operations on data on said bus, said generating means comprising:
   1. a register for receiving data,
   2. an accumulator, and
   3. means responsive to said program information for transmitting said data from said register to said accumulator.

11. A system as set forth in claim 10 wherein said means responsive to said program information is a program decoder.

12. A system as set forth in claim 11 wherein said data originates in said central control unit.

13. A system as set forth in claim 12 wherein said program information and said data are interleaved on said bus.

14. A system as set forth in claim 13 wherein said peripheral input unit is a keyboard.

* * * * *